March 28, 1961 T. McLAUGHLIN ET AL 2,977,177

AIRCRAFT FLIGHT PATH RECORDING DEVICE

Filed March 24, 1958 15 Sheets-Sheet 1

March 28, 1961 T. McLAUGHLIN ET AL 2,977,177

AIRCRAFT FLIGHT PATH RECORDING DEVICE

Filed March 24, 1958 15 Sheets-Sheet 2

March 28, 1961 T. McLAUGHLIN ET AL 2,977,177

AIRCRAFT FLIGHT PATH RECORDING DEVICE

Filed March 24, 1958 15 Sheets-Sheet 3

March 28, 1961 T. McLAUGHLIN ET AL 2,977,177

AIRCRAFT FLIGHT PATH RECORDING DEVICE

Filed March 24, 1958 15 Sheets-Sheet 4

March 28, 1961 T. McLAUGHLIN ET AL 2,977,177

AIRCRAFT FLIGHT PATH RECORDING DEVICE

Filed March 24, 1958 15 Sheets-Sheet 7

March 28, 1961 T. McLAUGHLIN ET AL 2,977,177

AIRCRAFT FLIGHT PATH RECORDING DEVICE

Filed March 24, 1958 15 Sheets-Sheet 8

March 28, 1961 T. McLAUGHLIN ET AL 2,977,177

AIRCRAFT FLIGHT PATH RECORDING DEVICE

Filed March 24, 1958 15 Sheets-Sheet 9

March 28, 1961 T. McLAUGHLIN ET AL 2,977,177

AIRCRAFT FLIGHT PATH RECORDING DEVICE

Filed March 24, 1958 15 Sheets-Sheet 12

March 28, 1961 T. McLAUGHLIN ET AL 2,977,177

AIRCRAFT FLIGHT PATH RECORDING DEVICE

Filed March 24, 1958

15 Sheets-Sheet 14

March 28, 1961 T. McLAUGHLIN ET AL 2,977,177

AIRCRAFT FLIGHT PATH RECORDING DEVICE

Filed March 24, 1958

15 Sheets-Sheet 15

United States Patent Office 2,977,177

Patented Mar. 28, 1961

2,977,177

AIRCRAFT FLIGHT PATH RECORDING DEVICE

Thomas McLaughlin, New Milford, N.J., Abraham G. Merlin, Cedarhurst, N.Y., Allen W. Beishline, Closter, N.J., and William Bergherr, New York, N.Y., assignors to Loral Electronics Corporation, Bronx, N.Y., a corporation of New York Filed Mar. 24, 1958, Ser. No. 723,469

19 Claims. (Cl. 346—8)

This application is a continuation in part of a co-pending application Serial No. 495,956, filed March 22, 1955, now abandoned, entitled Aircraft Flight Path Recording Device.

This invention relates generally to plotting and charting devices, and more particularly to an improved means for use in military aircraft for plotting and charting the course of the same in flight during successive stages of operation while the aircraft is on patrol or scouting missions. The invention contemplates providing the pilots of such aircraft with a continuous visual recording of the path of flight on a screen with reference to a target, and further, for providing a continuous record of such path of flight.

It is among the principal objects of the present invention to provide a device which will enable the pilot or co-pilot to fly and permanently record ground track as well as to mark technical or tactical data on the plot as the same is being drawn.

Another object of the invention lies in the provision of an electrically operated plotting device which may operate on information received from ground stabilization equipment, or computers which are capable of providing servo signals corresponding to the path flown by an aircraft with respect to its path of travel over the ground.

Another object of the invention lies in the provision of a plotting device of the class described which may consist of a single unit adapted to be fitted into the instrument panel control area disposed between the pilot and co-pilot of an aircraft, and so mounted upon slides as to permit tilting of the same toward either operator.

A further object of the invention lies in the provision of a direct viewing-type translucent pressure-sensitive material in which the trace is formed on an undersurface thereof, so as to be incapable of being affected by accidental touch of the operator, and in which the use of inks or other marking fluids is completely eliminated.

Still another object of the invention lies in the provision of an electric plotting device capable of plotting over a variety of scales, the selection of which depends upon the operator's choice, and the necessity of detail.

A further object of the invention lies in the provision of a ground track recording mechanism which may be of relatively small over-all dimensions, and which may yet afford an effective plotting area of relatively large size, thereby permitting recording during an extended period of flight.

A feature of the invention lies in the fact that many of the functions thereof are semi-automatic, that is to say, the function need only be initiated by the operator, after which the device completes the same without further attention on the part of the operator.

Another feature of the invention lies in the total elimination of electric conductors in wire form from fixed to moving parts of the device, the principal moving parts being provided with means for introducing selectively a plurality of voltages each of which causes a given function to commence.

Still another feature of the invention lies in the provision of automatic means for adjusting the device to operate in any of a plurality of plotting quadrants whereby maximum plotting area may be used for plotting movement in a given 90 degree sector of the polar co-ordinate system.

A further feature of the invention lies in the fact that the device comprises a relatively few number of parts while yet being capable of performing a large number of functions during operation thus permitting relatively expedient servicing when required.

Another feature of the invention lies in the provision of a plurality of stations, some of which are remote from the principal components of the device, to permit partial control by various members of a flight crew.

These objects and features, as well as other incidental ends and advantages will become more clearly apparent during the course of the following disclosure, and be pointed out in the appended claims.

On the drawings, to which reference will be made in the specification, similar reference characters have been employed to designate corresponding parts throughout the several views.

Figures 1*a*, 1*b* and 1*c* are schematic diagrams of the electrical circuits of a first embodiment of the invention.

Figure 15A:
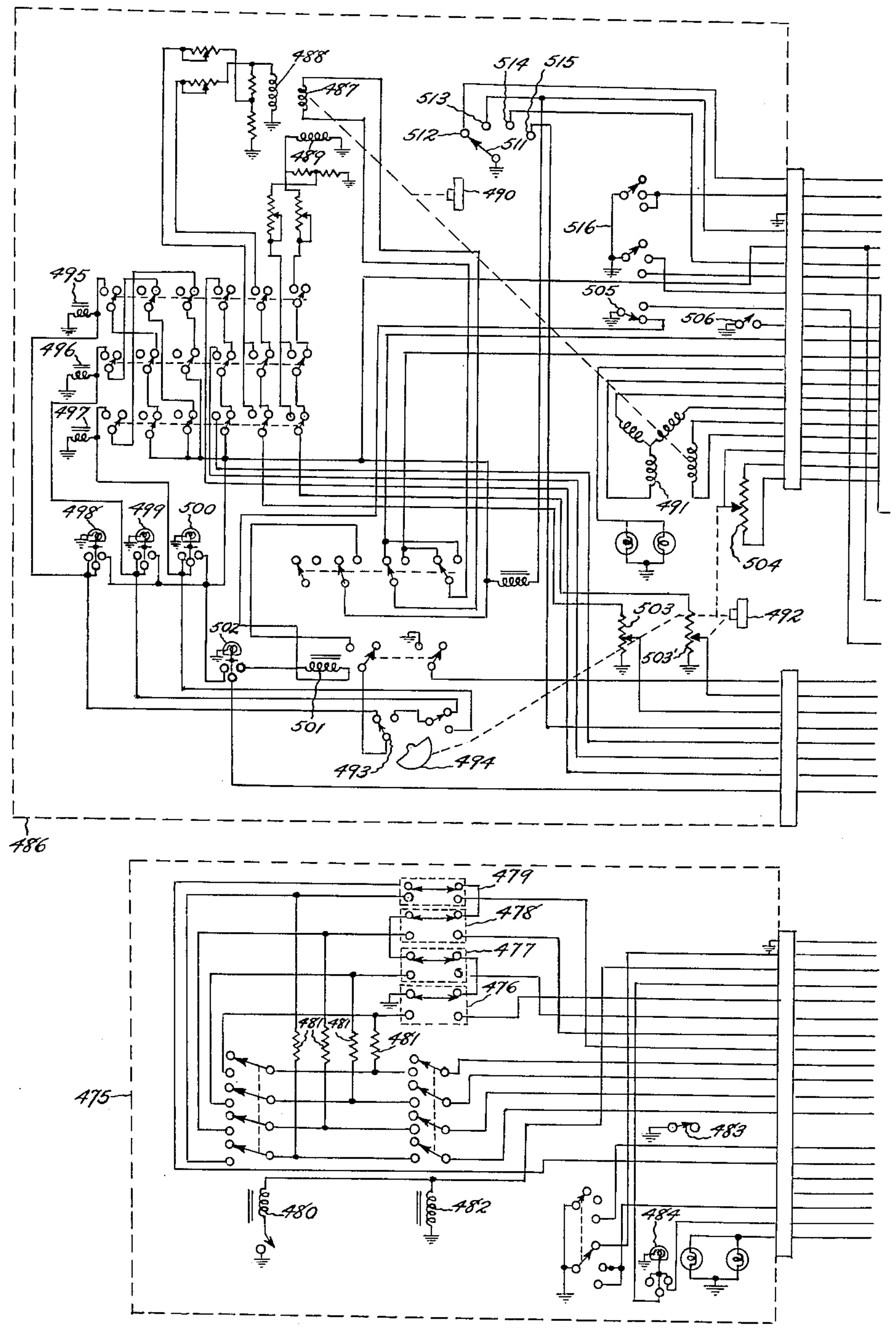
Figure 15B:
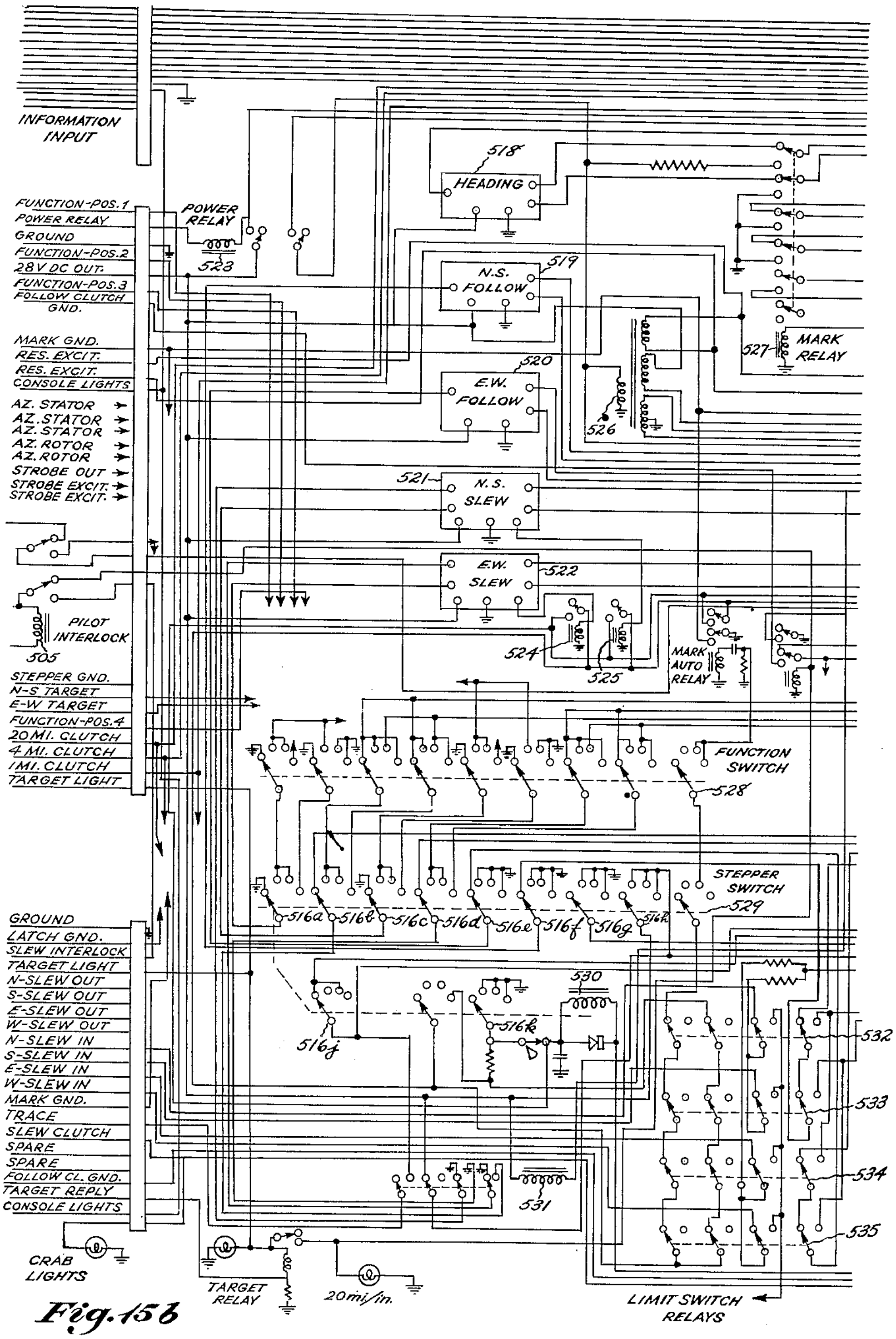
Figure 15C:
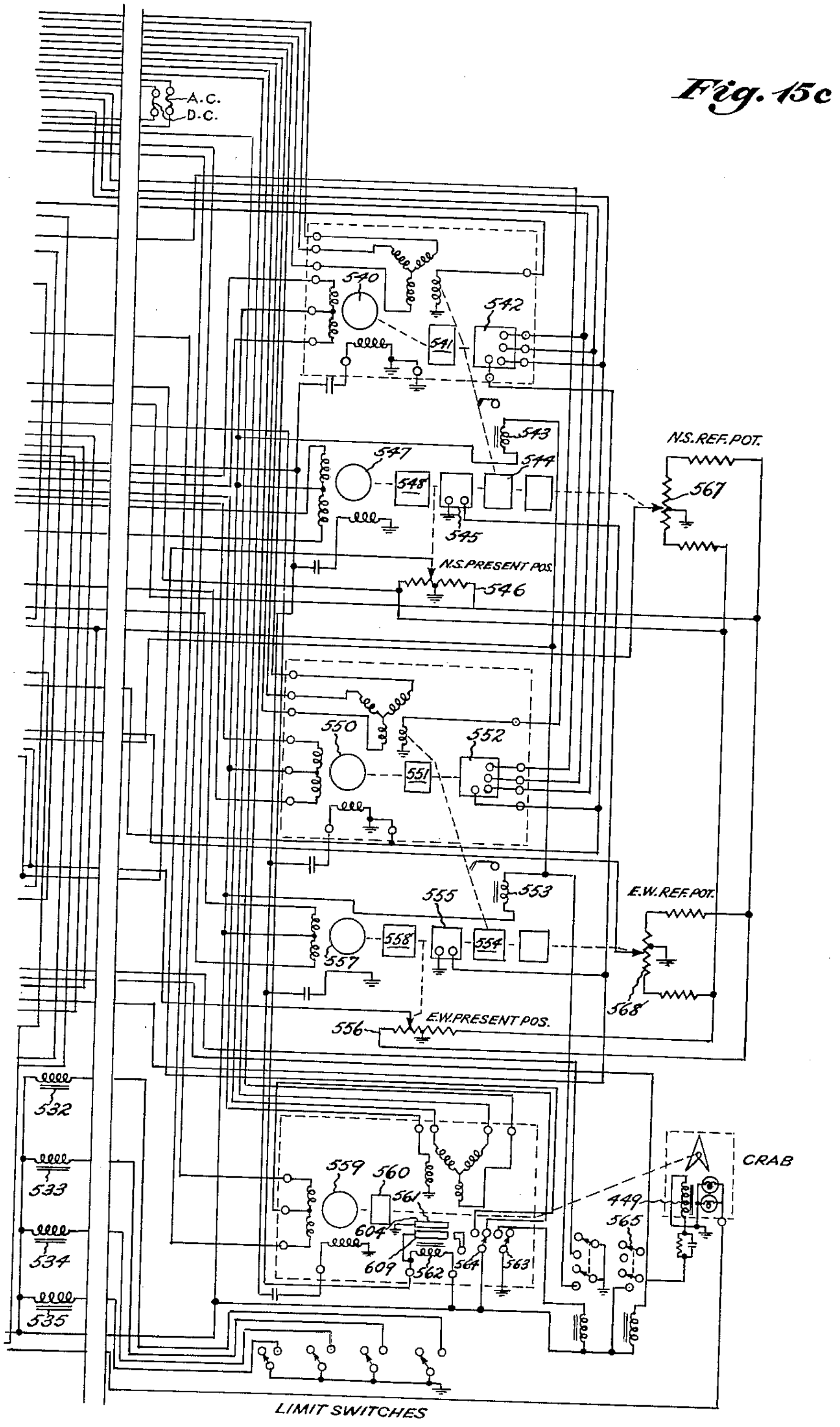

Figures 15*a*, 15*b* and 15*c* are schematic diagrams of the electrical circuit of the second embodiment.

Figure 12:
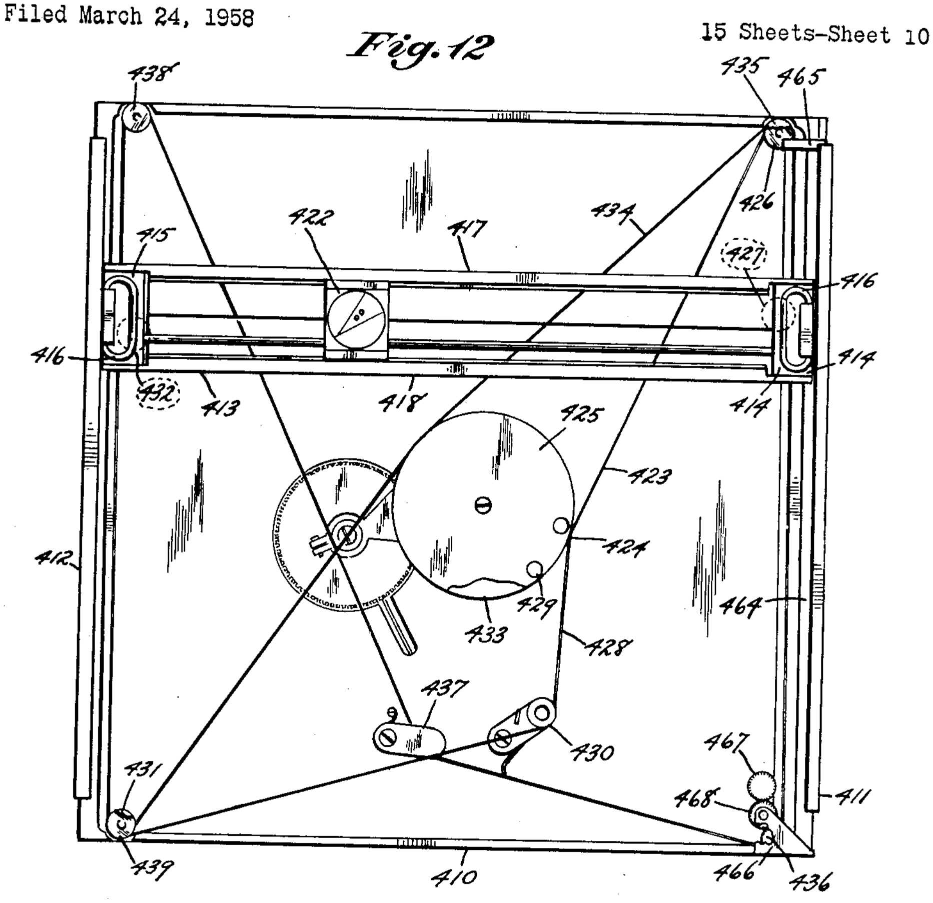
Figure 12 is a plan view, corresponding generally to that seen on Figure 3, but showing a second embodiment of the invention.
Figure 16:
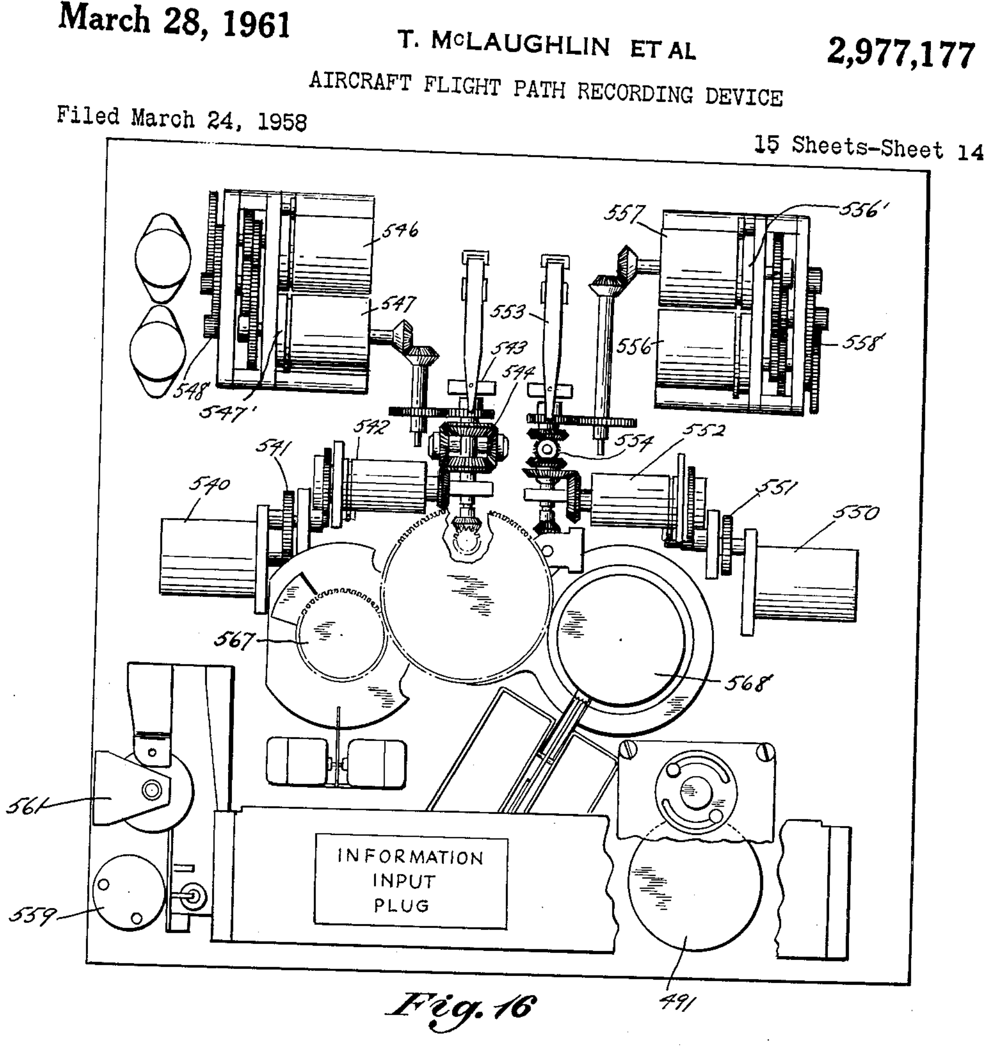

Figure 16 is a fragmentary bottom plan view showing that side of the second embodiment not shown on Figure 12.

Figure 17:
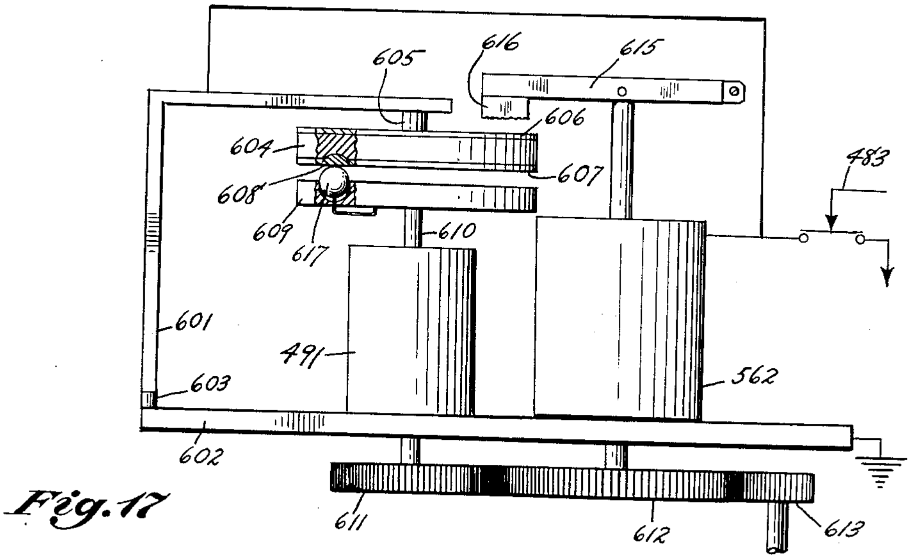

Figure 17 is a schematic view showing switch means controlling a heading servo motor which comprises a part of the second embodiment.

Figure 18:
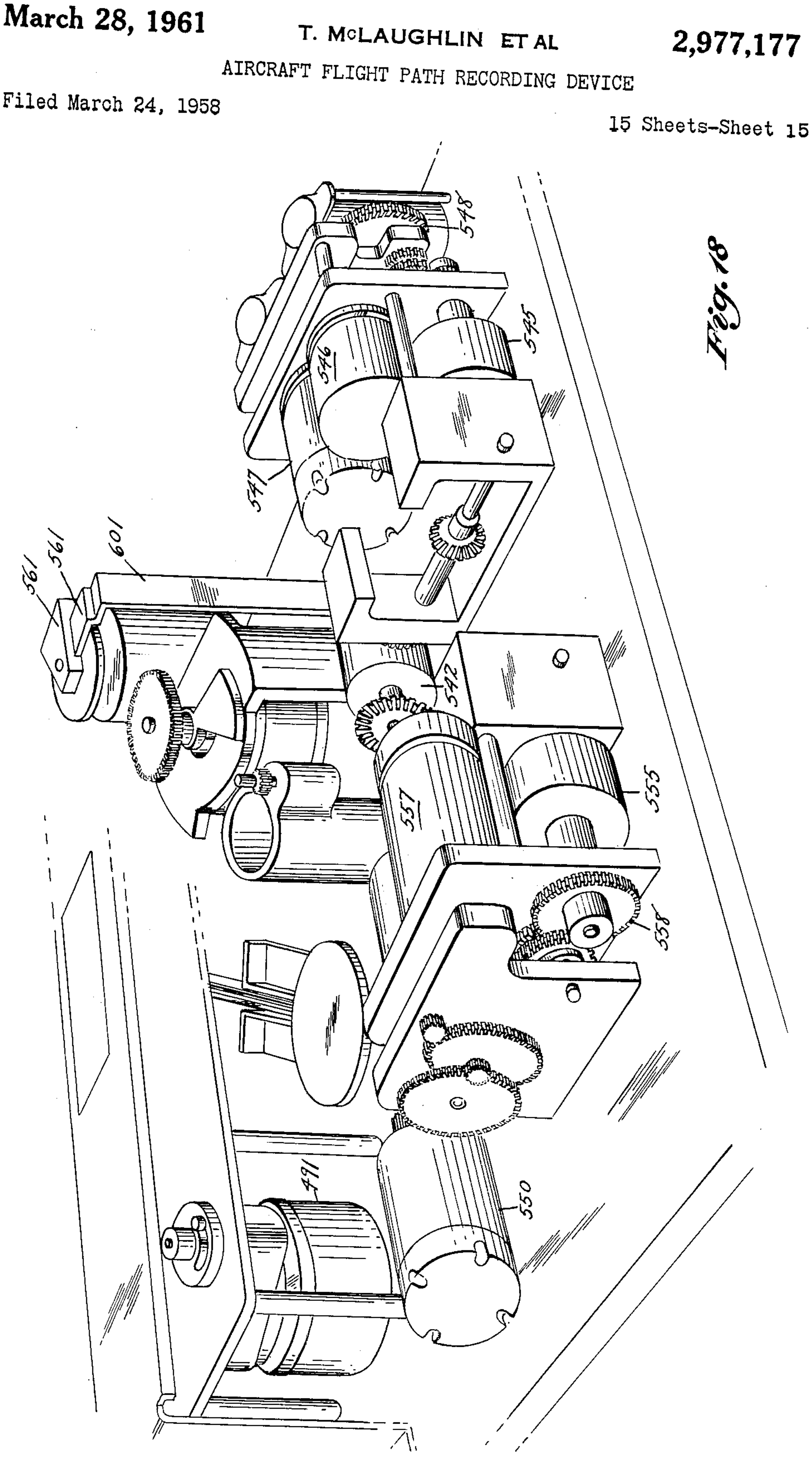

Figure 18 is an enlarged fragmentary view in perspective as seen from the upper righthand portion of Figure 16. In this view certain elements have been eliminated for purposes of clarity.

Before entering into a detailed consideration of the structural elements of the first embodiment of the device, a description of the functions of the same will be made at this point in the disclosure with a view toward facilitating discussion of the structural aspects thereof.

Although the invention is not limited to the specific uses described herein, a specific application of the device lies in facilitating the directing of the course of an aircraft in locating and attacking submerged submarines. The device aids in flying certain tactical flight patterns after the target is no longer in radar view. It converts the ground track information supplied by an associated ground position indicator, which forms no part of the present invention, into a plot of the ground track relative to an initial fixed point or other references, such as target data. Information such as target location, or location of dropped buoys, mines, etc., is also plotted.

Figure 2:
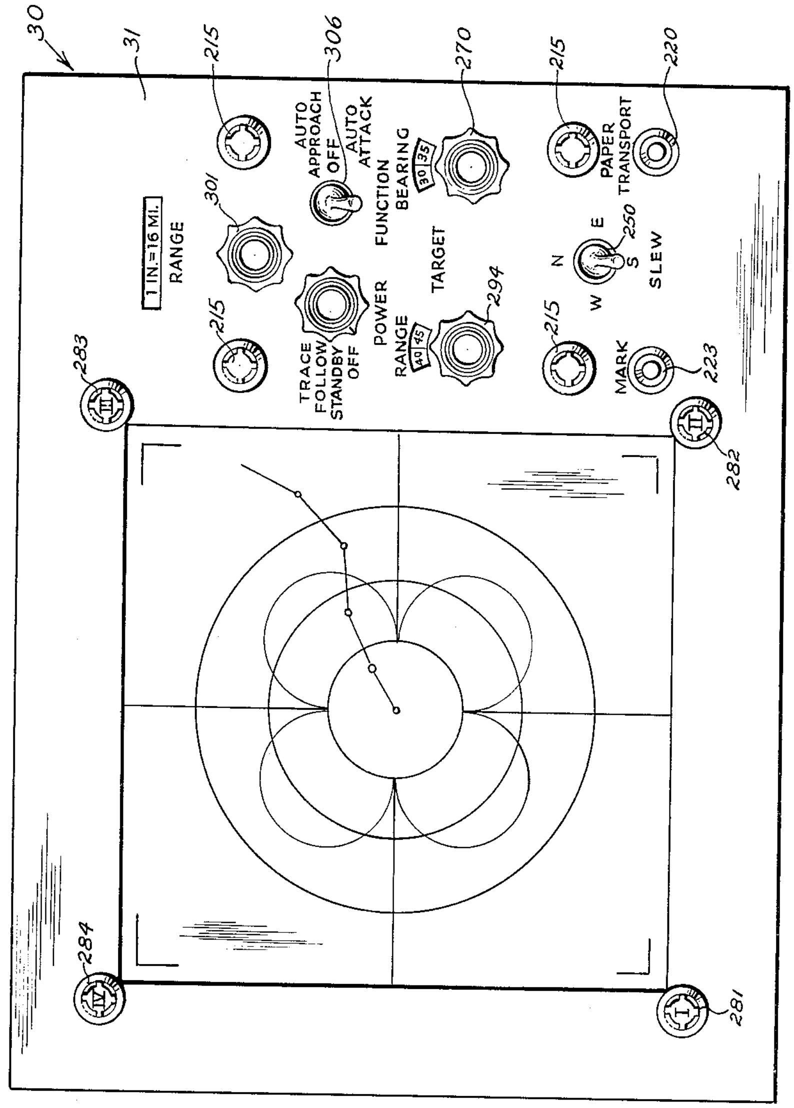
Figure 2 is a front elevational view of the embodiment in which the device is enclosed in a suitable casing, having a control panel and plotting area on a forward wall thereof.

Referring to Figure 2 of the drawings, after taking off, the pilot moves the power switch to standby position thus energizing the device and connecting the same with a source of servo information. To enable the tracing means (not shown on Figure 2) to follow in accordance with the path of flight of the aircraft the power switch must then be placed in "follow" or "trace." For searching, a relatively small scale is desirable, as the course of the search may cover many miles, and the range knob is set for a relatively small scale, as for example, one inch to sixteen miles as indicated on Figure 2. The film transport button is then pressed to cause the feeding of a fresh portion of recording film into the plotting area shown to the left of the control panel. Depending upon the general bearing or quadrant at which the search will be flown, the slew switch is moved to bring the crab and stylus to a desired initial position so that the maximum flying area within the exposed navigating area will be available to plotting. If desired, the attack control may be operated to automatically center the crab. The power switch is then moved to the "follow" or "trace" position. On the "trace" position, a solenoid activates the stylus so that the plotting of the path of flight begins from the initial position selected. In the "follow" mode, the position of the stylus beneath the recording film is indicated by a light which shows through the pressure-sensitive material and is visible to the pilot. The position of the plane is thus known without marking the pressure-sensitive material.

Upon receiving target information in terms of range and directional bearing, the pilot sets the target knobs to correspond thereto. The range switch, at the upper portion of the control panel is set to a shorter range scale, either one mile per inch or eight miles per inch. The setting of the bearing knob will activate one of the four quadrant indicator lights, while the setting of the range switch shifts the positioning of electrical potentiometers to provide for a sufficient plotting range during subsequent flight. The paper transport button is again pressed to automatically deenergize the stylus to permit another portion of plotting material to be moved into plotting position. Finally, the function switch momentarily is moved from the off position to the auto approach position. The moving of this switch to the above position causes the crab and stylus to move to an initial position for tracing the path of flight during the approach stage of the flight of the plane toward a representation of the target indicated by an illuminated quadrant light. At this point, the plane may be flown along the target bearing to the position indicated.

Upon arrival at the position where the target was reported, a substantial period of time will in most cases have elapsed. At this point, the range switch is set to the largest scale, approximately one mile per inch which setting causes the quadrant indicator light to be extinguished. If necessary, the paper transport button is again pressed to bring into position a fresh portion of plotting material. The function switch is then moved to the auto attack position which causes the crab and stylus to move to the center of the plotting area, during which time the stylus is deenergized so that no tracing occurs. When the center is reached, the plane progress has been retained, and trace resumes tracking the transpired distance from the center of the plotting area. At the time of dropping buoys, or at any other position, the pressing of the mark button causes a second stylus to impress a mark upon the tracing material indicating the position of the plane at the time of marking.

Upon return to base, the pressure-sensitive material may be removed from the device to serve as a permanent record of the path of flight of the aircraft during a given patrol operation.

With the foregoing discussion in mind, reference may be now had to the remaining figures in the drawings during the following description of the structural elements of the first embodiment.

Figure 1A:
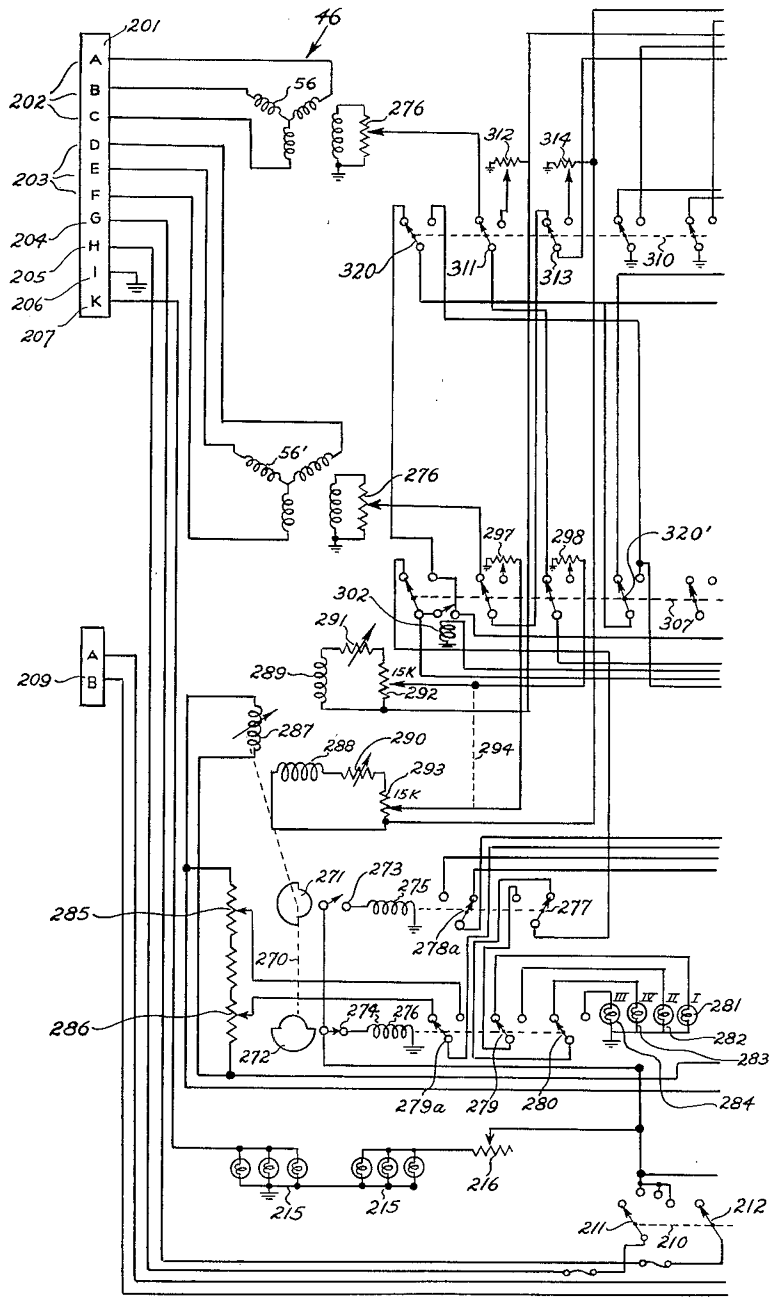
Figure 1C:
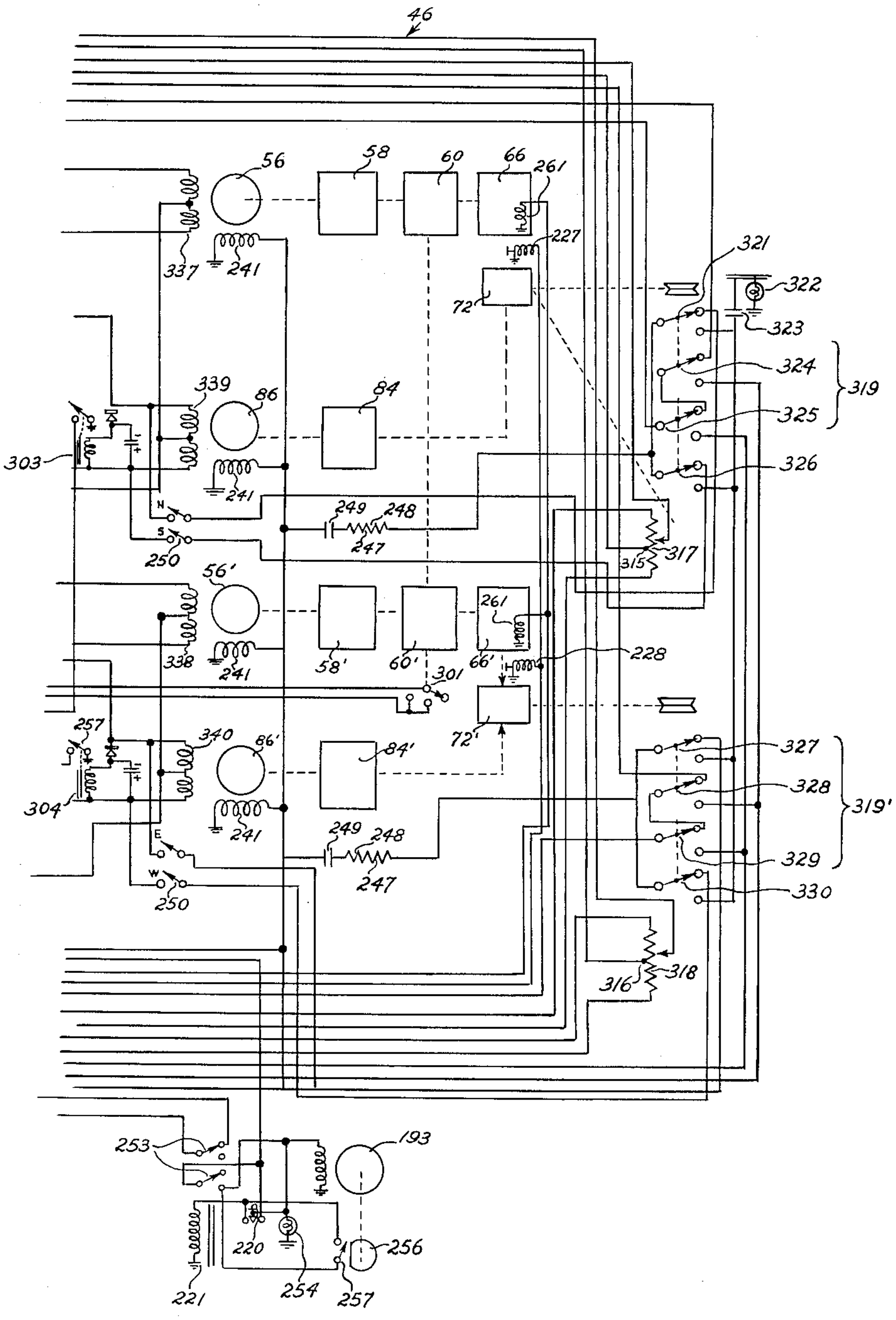
Figure 1B:
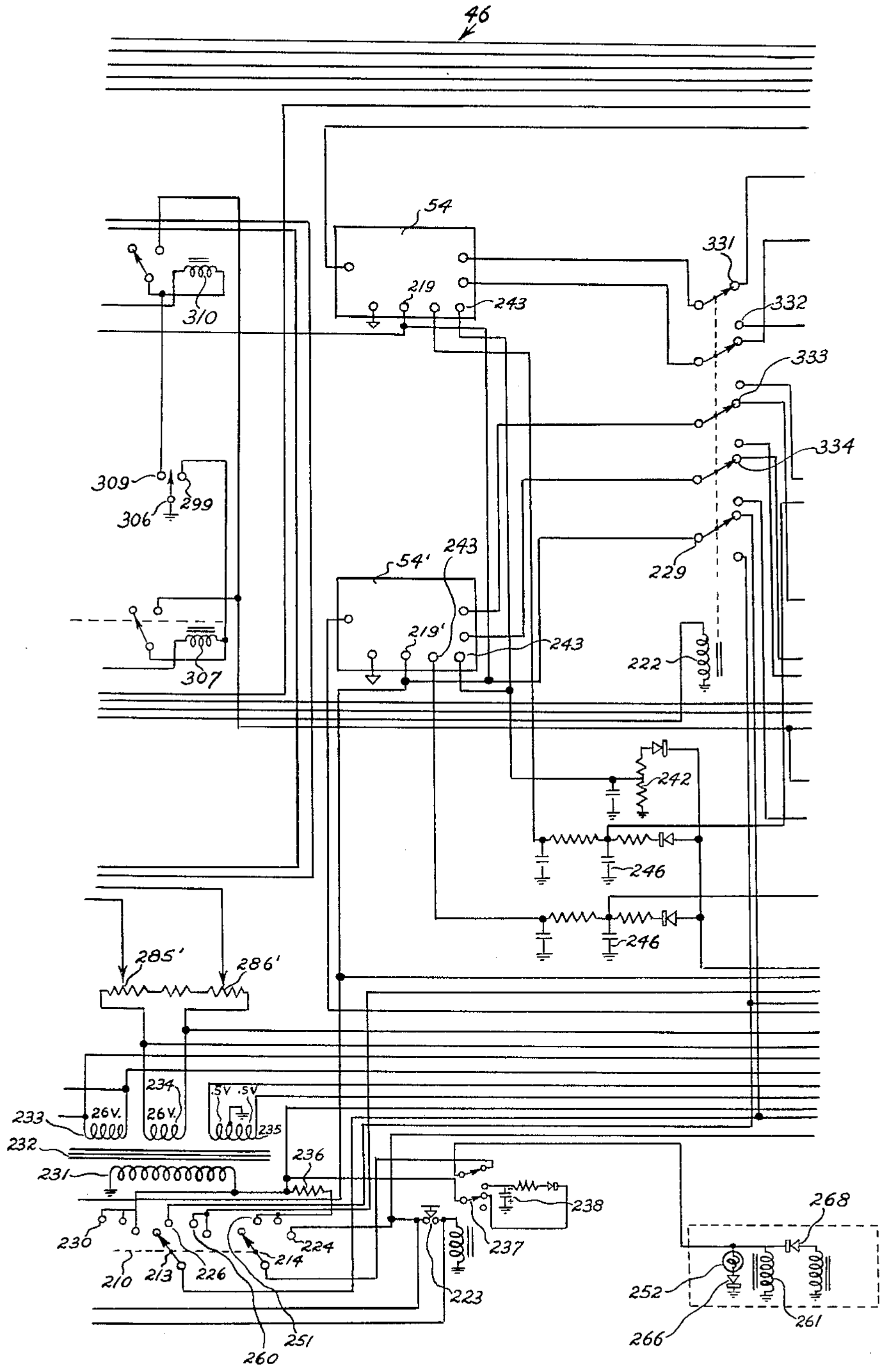

In accordance with the first embodiment of the invention, the device, generally indicated by reference character 30 (Figure 2) comprises broadly: a casing element 31, a frame element 33 (Figure 8*a*) a first or north-south follow element 34 (Figure 3), a second or east-west follow element 36, a crab drive element 38, a crab element 40 having a stylus element 42 thereon (Figure 8), a paper transport element 44, and electrical-mechanical control means 46 (Figures 1*a*, 1*b*, and 1*c*).

Figure 3:
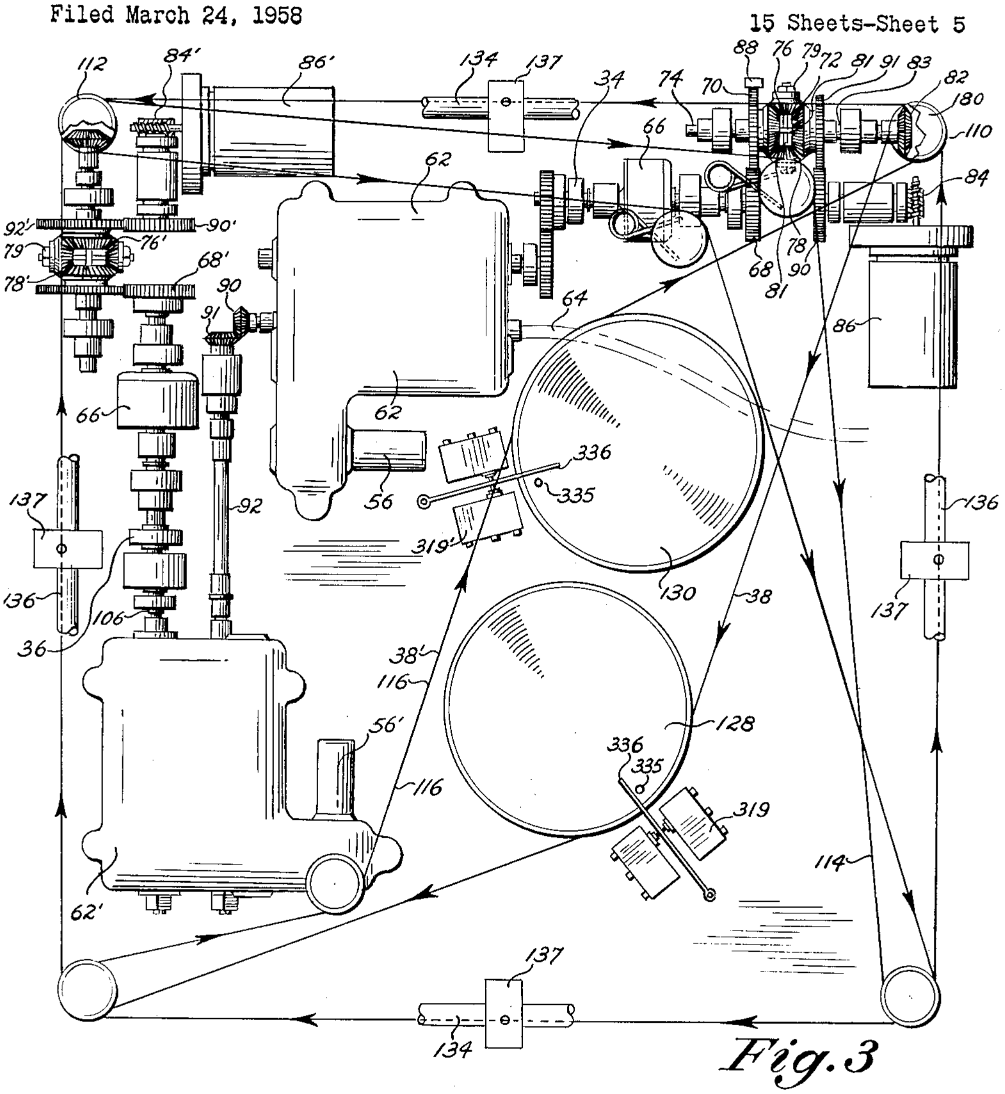
Figure 3 is a schematic view of the mechanically operated components of the device, including cable means for moving a crab element bearing a tracing stylus.
Figure 4:
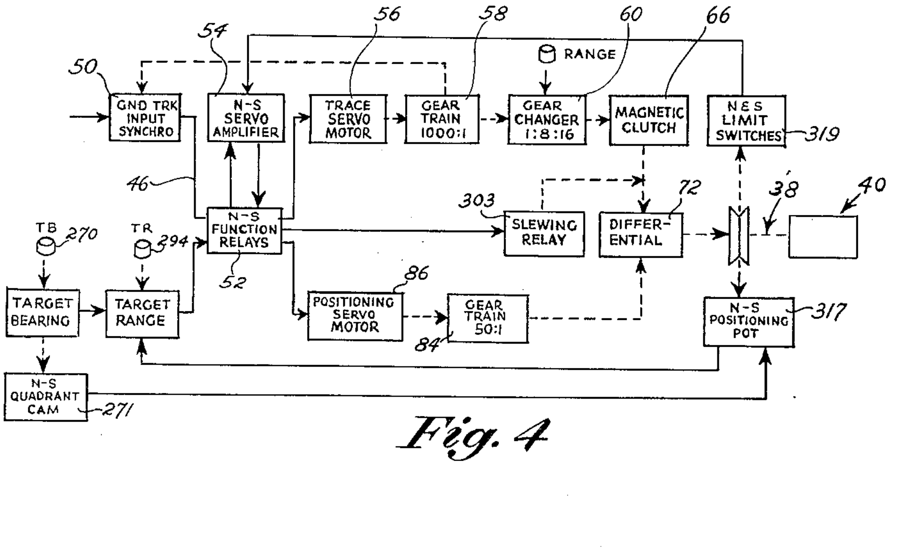
Figure 4 is a block diagram of the components involved in controlling the north-south movement of the crab element, electrical connections being shown in full lines while mechanical connections are shown in dashed lines.

Referring to Figure 4 of the drawings, there is shown a block diagram of the north-south follow element 34, which will serve equally well to outline the operation of the east-west follow element 36. Accordingly, corresponding parts of both elements 34 and 36 are designated by similar reference characters with the additional suffix prime ('), thus avoiding needless repetition. As may be seen on Figure 4, coordinated servo information, in this case only the north-south component, is supplied by means of a ground positioning indicator (not shown), which may be of any suitable type, the details of which form no part of the present invention, to a ground track input synchro 50. This information, in the form of an electrical voltage, passes through the north-south function relays 52, to be amplified by the north-south servo amplifier 54, after which the same operates the trace servo motor 56. Motion is transmitted through a gear train 58 having a very high mechanical reduction as for example, 1000 to 1, there being a mechanical connection between the gear train 58 and the north-south ground track input synchro 50 to regulate the movement of the motor 56. Motion is then transmitted through a gear changer 60 which varies the ultimate scale at which the crab element 40 will plot its path through a magnetically operated clutch 66, and a differential 72, which drives the crab drive element 38. Referring to Figure 3, both gear train 58, and gear changer 60, are preferably disposed within a single housing 62, the servo motor 56 being associated therewith, and the gear changer 60, being operated by a control shaft 64. Gears 68 interconnect the clutch 66 with a control gear 70 which is directly connected to one-half of the differential 72. The differential 72 includes bevel gears 76 and 78, both of which are mounted on a frame 79 which is capable of rotation. The shaft 81 is disposed at right angles to and connected with the shaft 83, so that during the normal follow function motion is transmitted through the parts described above through the driven gear 82 to the crab drive element 38. During manual slewing, or automatic positioning functions, motion is transmitted through a gear reduction means 84 by the positioning motor 86. During automatic positioning, an electrically operated latch 88 engages the control gear 70 to permit motion to be transmitted through gears 90 and 91 to move the gears 76 and 78 as heretofore described.

As mentioned hereinabove, the second or east-west follow element 36 is substantially similar, the gear changer means being interconnected with that of the element 34 through bevel gears 90 and 91, the latter of which is mounted upon a shaft 92 so that the single flexible shaft 64 may simultaneously serve to change both follow elements to operate on a common gear reduction.

Figure 6:
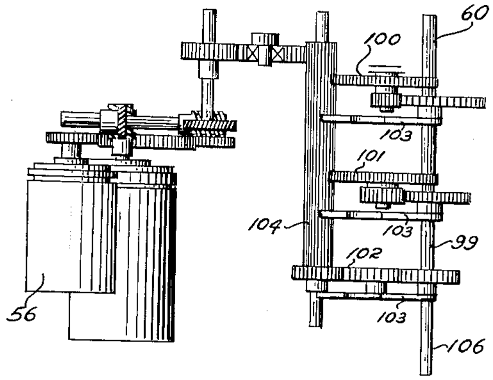
Figure 6 is a fragmentary plan view showing the gear change means for varying the scale of plotting of the device during operation.
Figure 7:
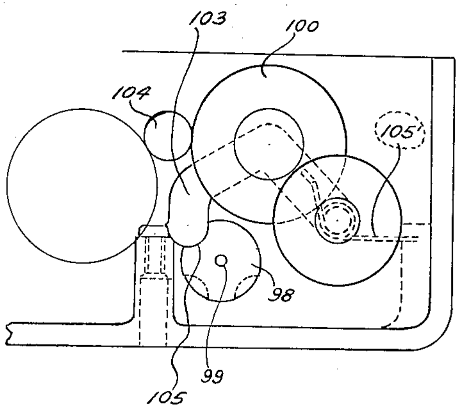
Figure 7 is a fragmentary schematic view as seen from the lower portion of Figure 6.

Reference is made at this point to Figures 6 and 7 where there is illustrated a suitable gear changing means, although it is to be understood that the specific means shown is exemplary only, as other types may be substituted where desired. The gear changing means 60 includes a plurality of cams, one of which is indicated by reference character 98 on Figure 7, each being mounted coaxially upon a shaft 99 rotated by motion imparted through the cable 64 (Figure 3). Three gear reduction clusters 100, 101 and 102 are mounted upon similar rocker arms 103 whereby they may be selectively engaged with an elongated driving gear 104. Each of the cams 98 includes a low point 105, the points 105 being spaced a suitable angular distance from each other so that as the shaft 99 is rotated, the low points come selectively into contact with the rocker arms 103 permitting one and only one of the clusters 100, 101 and 102 to engage the gear 104 under the action of springs 105'. As each of the clusters 100—102 drives the output shaft 106, no separate clutch is necessary to permit changing from one gear ratio to another.

The crab drive element 38 (Figure 3) includes two separate cable drive means, one of which is driven by the first or north-south follow element 34, and the other of which is driven by the second or east-west follow element 36.

Figure 8:
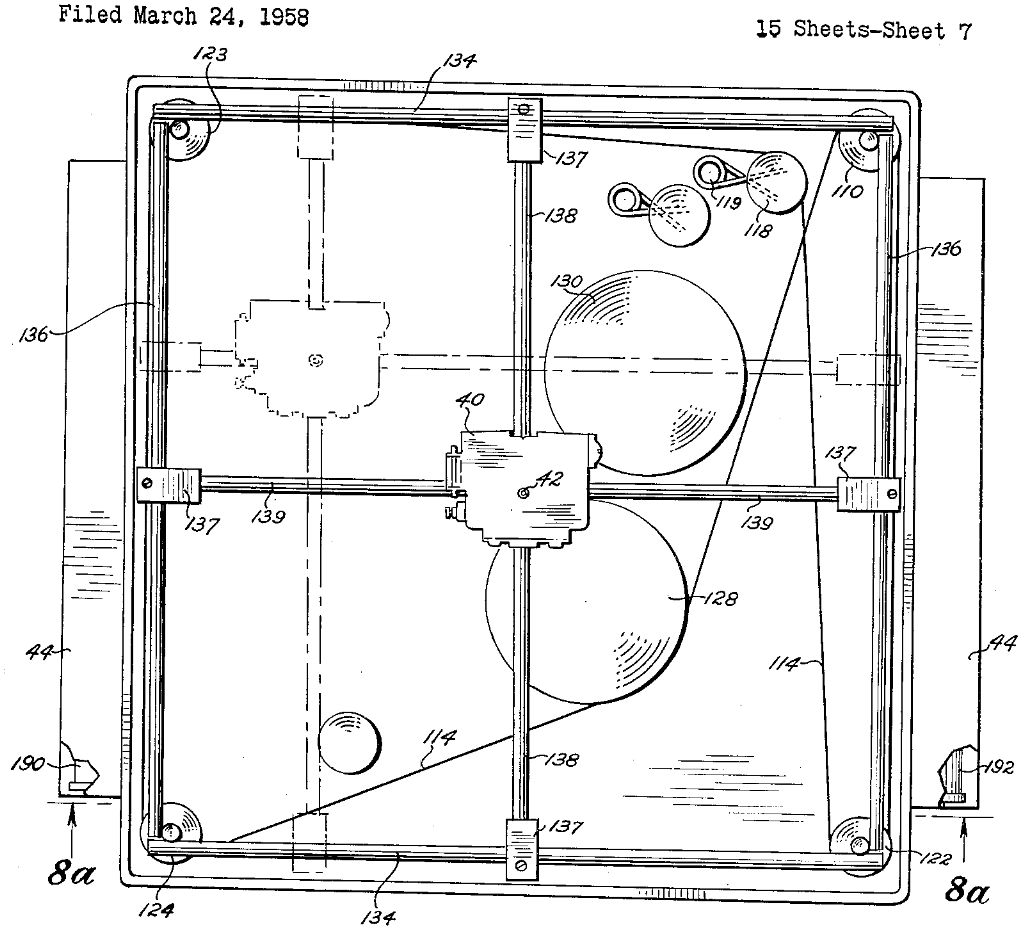
Figure 8 is a fragmentary view in plan of the cable drive element.
Figure 8A:
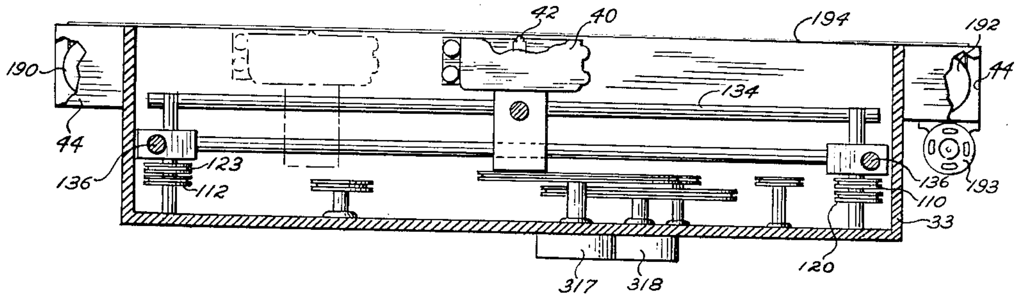
Figure 8A is a fragmentary sectional view as seen from the plane 8*a*—8*a* on Figure 8.
Figures 9, 10:
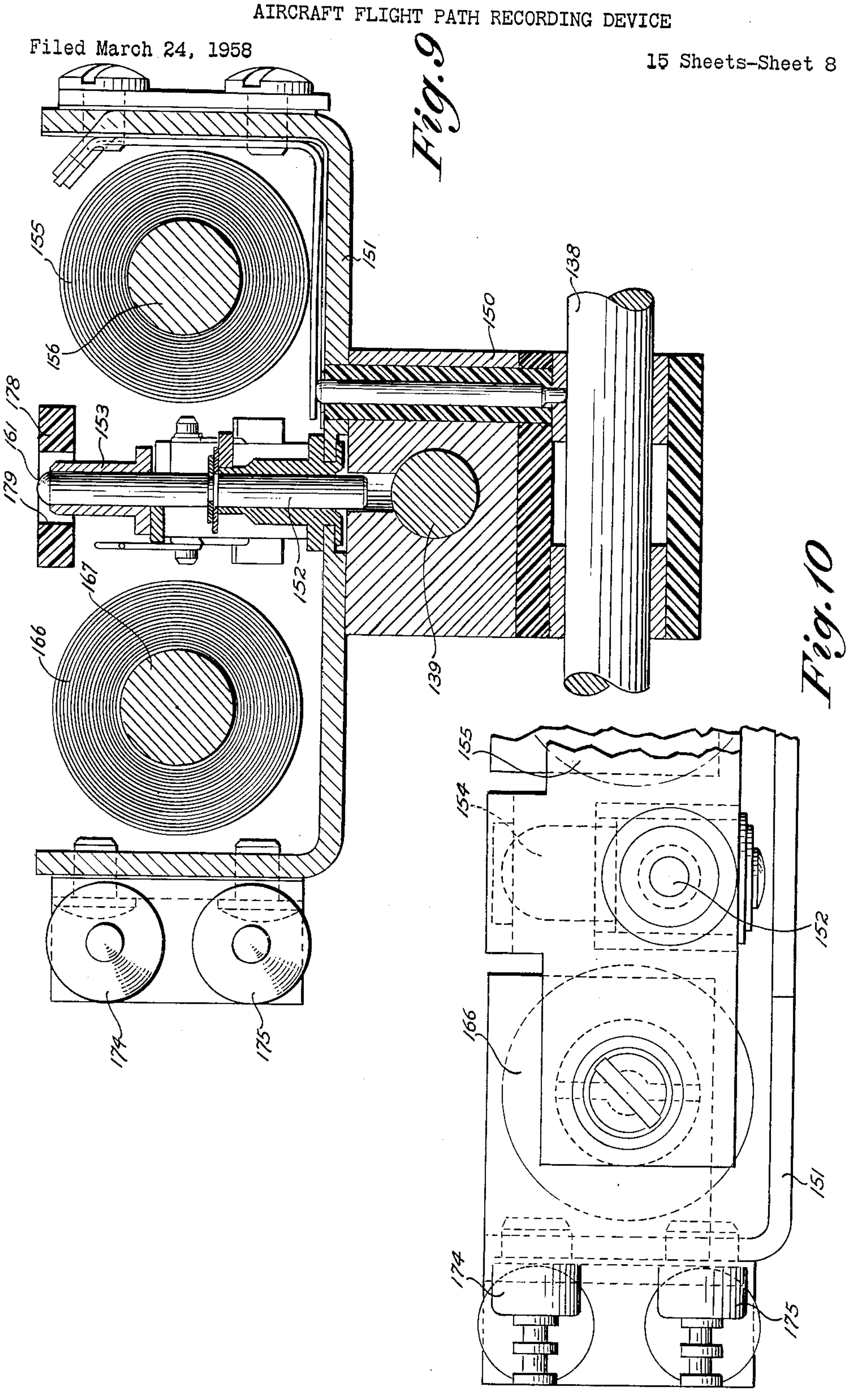
Figure 9 is a fragmentary sectional view showing details of the crab element and stylus element.
Figure 10 is a fragmentary view in elevation as seen from the opposite side of Figure 9.
Figure 11:
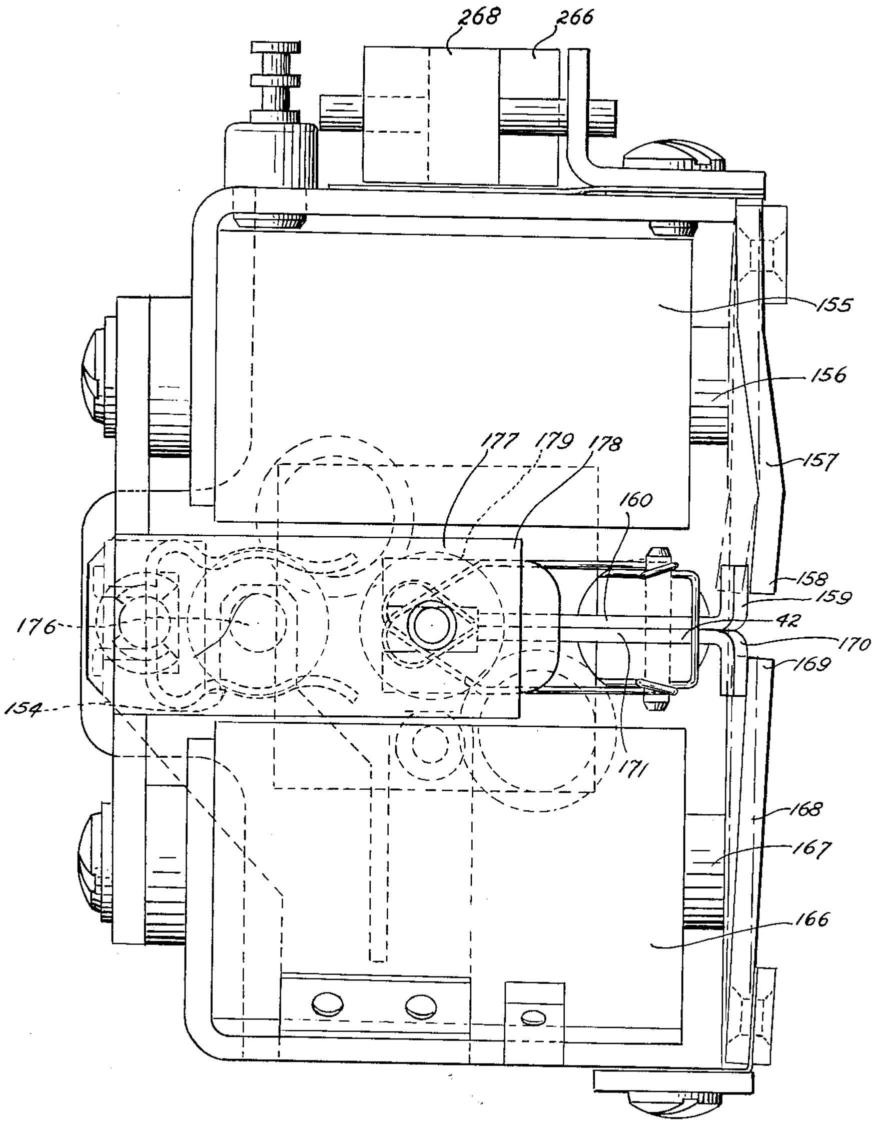
Figure 11 is a plan view of the crab element.

Referring to Figures 3, 8 and 8*a*, the element 38 includes a driven pulley 110, which serves to transmit north-south movement, and a driven pulley 112 providing a similar function in an east-west direction. Figure 8 shows the north-south driving cable 114 only, the east-west cable 116 having been eliminated (it may be seen on Figure 3) for purposes of clarity. Motion is transmitted through the pulley 110 to the cable 114 which passes about an idler pulley 122, pulley 118, and associated spring structure 119 which serves as a tensioning device, thence about idlers 123 and 124, the large pulley 128 and again to the driven pulley 110.

Referring to Figure 3, a generally similar arrangement is employed driven by the east-west pulley 112 resort being made to various idlers to confine the path of the cable 116 such that it will not interfere with other parts to the device.

East-west side rails 134 and north-south side rails 136 are disposed in separate planes, and have slidably mounted thereon a plurality of supporting blocks 137 connecting corresponding cables 114 and 116. Interconnecting the blocks 137 are a pair of crab supporting rails 138 and 139 the rail 138 being electrically insulated, as shown on Figure 5, the purpose of which will become more clearly apparent at a point later in the disclosure. As may be seen on Figures 5, 8 and 8*a* the crab element 40 is slidably mounted upon the crab supporting rails 138 and 139 in such manner that the movement of the crab element will represent the vector addition of movement of the supporting rails 138 and 139, which are constrained to move at right angles with respect to each other. Thus, movement of the cable 114, representing pure north-south movement of the aircraft, is transmitted through the supporting blocks 137 mounted upon the rails 136 to result in the supporting rail 139 moving laterally with respect to its own axis, and moving the crab element upwardly or downwardly as seen on Figure 8, during which time the crab element slides along the supporting rail 138 without disturbing the location of the same. In a similar manner, east-west movement results in lateral movement of the supporting rail 138, and normally both movements will occur simultaneously to displace the crab element to correspond to movement of the aircraft, as indicated by the alternate location of the crab element shown in dashed lines on Figure 8.

The details of the crab element 40 are best seen on Figures 5, 9, 10 and 11, to which reference is now made. The crab element includes a crab support member 150 which directly engages the rails 138 and 139. The crab support member is preferably formed in two sections as indicated on Figure 9, the lower portion of which is cast nylon, and the upper portion of which is aluminum or other light-weight metal. The member 150 supports a metallic frame member 151, which, in turn, mounts a trace stylus unit 152 and a mark stylus unit 153, as well as illumination means 154, which indicates the position of the stylus units 152 and 153, when in operation.

Figure 5:
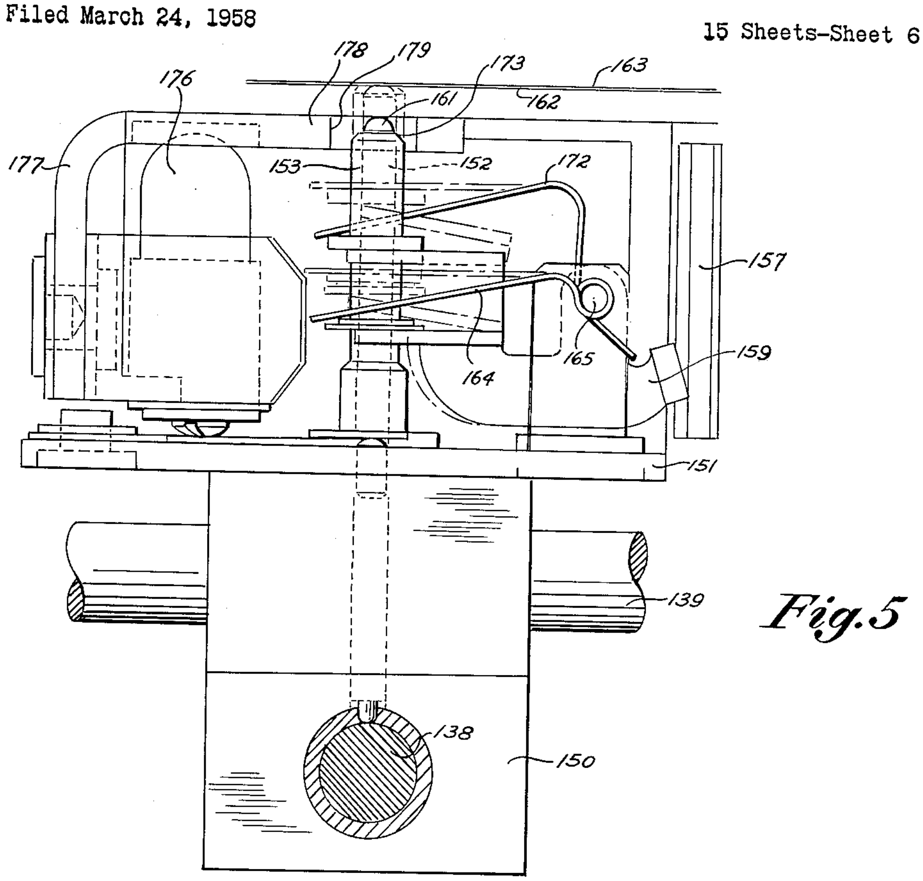
Figure 5 is a fragmentary view in elevation showing the stylus element and relay means for actuating the same.

The trace stylus unit 152 is adapted to draw a continuous line in the plotting area, as shown on Figure 2, and includes an electro magnet 155 having a core 156 adapted to attract an actuator member 157. The actuator member includes an end portion 158 adapted to engage a flange 159 on a follower 160, which results in moving the tip 161 of the stylus to engage the undersurface 162 of the pressure-sensitive translucent projection paper 163 (Figure 5). A return spring 164 mounted upon shaft 165 normally urges the tip 161 out of contact with the paper 163 when the electro magnet 155 is deenergized.

The mark stylus unit 153 is generally similar, and is adapted to place a small circular mark upon the plotting area to indicate specific points along the trace line to show, for example changes in course, location of bomb drops or other tactical information. It includes an electro magnet 166 having a core 167, an actuator member 168, the end portion 169 of which is adapted to engage a flange 170 on a follower 171. A return spring 172 maintains the circular edge 173 out of contact with the paper 163. As may best be seen on Figure 9, the mark stylus unit 153 is in the form of a hollow cylinder and is concentrically arranged with respect to the tracing stylus unit 152 which is in the form of a solid cylinder.

The illumination means 154 includes a bulb 176 which transmits light to a curved Lucite bar member 177, the tip 178 of which is provided with an opening 179, which surrounds the trace and mark stylus units 152 and 153.

Referring to Figure 8*a* the paper transport element 44 includes supply roller means 190, take-up roller means 192 and a paper transport motor 193. The supporting platen 194 maintains the pressure-sensitive translucent paper 163 within a plane to support the same for contact with the stylus units. The transport motor 193 may be manually energized by the pilot where needed.

The control means 46 is indicated schematically on Figures 1*a*, 1*b* and 1*c*, and includes electrical and mechanical components, the location of some of which are indicated on the other figures of the drawings. Interconnection with the sources of electromotive energy supplied by the aircraft is made through a connector 201, having terminals 202 through which north-south synchro information is supplied, terminals 203, which are interconnected to the source of east-west information, a single terminal 204 interconnected to the alternating current generating system of the aircraft which normally supplies 110 volt, 400 cycle current, a single terminal 205 interconnected to the direct current battery supply of the aircraft which normally supplies 28 volts direct current, a common ground terminal 206, and a single terminal 207, which may be employed to supply direct current to the panel lights 215 when it is desired that the same be illuminated even when the device is not in use.

If desired, a separate connector 209 connects to a switch for providing auxiliary means for operating the mark stylus unit 153.

The power switch 210 is of multi-gang type, including a first gang 211 connected to the direct current source, a second gang 212 connected to the alternating current source, and third and fourth gangs 213 and 214, respectively. In the "standby position," 28 volt direct current is supplied to the plotting area lights 215 through a dimming rheostat 216, as well as to the filament terminals 219 and 219' of the north-south servo amplifier 54, and the east-west servo amplifier 54'. Twenty-eight volts direct current is also supplied to the paper transport switch 220, the paper transport relay 221, the output relay 222, the mark button switch 223, as well as contact four (indicated by reference character 224) of gang 4 (indicated by reference character 214) of the power switch 210. This connection is interlocked through the paper transport relay 221. When the relay is energized, the connection is broken, thus preventing the formation of a trace while the paper is being advanced to a subsequent position.

Twenty-eight volts is also applied from the output relay 222 to the arm of the third gang 213 of the power switch. The output of the third gang at the second contact 226 thereof is fed to the north-south latching relay 227 and the east-west latching relay 228, which in the standby position, are closed so that the manual slewing is possible. In this position the servo loop is in operation but the information is not transmitted to the crab. Thus, no catching up to nulls is necessary when the switch 210 is positioned to follow or trace. Twenty-eight volts is also supplied to the contact 229 on the output relay 222.

While in standby position, as regards the power switch 210, the second gang 212 supplies the 115 volt 400 cycle alternating current to the primary winding 231 of the power transformer 232, the same having three secondary windings 233, 234 and 235, respectively. Alternating current is also transmitted through a dropping resistor 236 to terminals 251 of the fourth gang 214. Alternating current is also supplied to the mark relay contact arm 237, and is used to charge through a rectifier, the condenser 238, the discharge of which operates the mark stylus. The north-south follow motor 56 and east-west follow motor 56' are provided with fixed phase windings 241, as are positioning motors 86 and 86' which are also supplied with alternating current. The power pack rectifier 242 supplies a bias voltage to a contact 243 on each of the north-south and east-west amplifiers 54 and 54', a second rectifier 246 providing plate voltage. The phasing networks 247 including resistors 248 and capacitors 249 transmit alternating current through the limit switches 319 and 320 to the manual slew switches 250 which actually include means for closing four separate circuits as indicated on Figure 1*c*.

In the "standby" position, the fourth gang 214 of the power switch 210 transmits alternating current through contacts 251 to the stylus lamp 252, through the resistor 236.

Upon take-off, as mentioned hereinabove, the power switch 210 is moved to the "follow" position which may be accompanied by moving a fresh section of plotting material to the plotting area. The latter operation is accomplished by pressing the paper transport button 220, energizing the paper transport relay 221, which closes the paper transport switch 253. This illuminates the paper transport light 254 showing that the unit is in operation and activates the paper transport motor 193 throughout the cycle, during which time the entire plotting area is provided with fresh plotting material. If desired, the operation of the motor 193 may be entirely manual, by eliminating the relay 221, together with cam 256 and switch 257. If desired, manual slowing to an initial fix may be performed at this time.

Upon moving the power switch 210 to the "follow" position, the third contact of the third gang, indicated by reference character 260, sends direct current to the clutch coils 261 and interrupts the flow of current to the latch coils 227 and 228. Thus, the follow function is taken over in which servo information is transmitted through the clutch mechanisms the release of the latches permitting the motion to be fed into the north-south and east-west differentials.

At the completion of the slewing to the initial starting point, the power switch 210 is moved to the "trace" position, which differs from the follow position only in the energizing of the trace stylus relay 261 by the supplying of direct current through the contact 224 of gang 214. In this position, the lamp 252 remains illuminated by the direct current which passes through the diode 266 in a downwardly direction as seen on Figure 1*b*, and current is blocked from energizing the mark stylus relay by virtue of the fact that the diode 268 prevents the flow of current through the same in the downwardly direction. Thus, the lamp will continue to show the position of the crab beneath the plotting area while the trace stylus simultaneously marks a continuous line indicating the path of flight upon the pressure-sensitive material.

Upon receiving target location information, generally supplied in terms of range and bearing, the pilot first sets the bearing by means of the knob 270 (see Figures 2 and 1*a*). Rotation of the knob 270 simultaneously rotates cams 271 and 272, the former of which over a given 180 degree arc, will activate the north-south quadrant switch 273, while the latter of which will activate the corresponding east-west quadrant switch 274. As the low areas on the cams 271 and 272 are spaced 90 degrees apart, it will be apparent that over the first quadrant (i.e. a bearing between 0 and ninety degrees), the third quadrant (i.e. 180 to 270 degrees) and the fourth quadrant (i.e. 270 to 360 degrees) the switches 273 and 274 will be placed in different positions, the exact combinations being a matter of choice. For example, in the first quadrant the switch 273 may be open and the switch 274 may be closed. As may be seen on Figure 1*a*, the various combinations activate relays 275 and 276, which in turn operate switches 277 to 280, inclusive. The network formed by these switches will illuminate one of the quadrant lights 281 to 284, inclusive, one light corresponding to each of the quadrants. These lights, which may be seen on Figure 2, indicate to the pilot the quadrant in which he will be plotting, and serve as a visual representation of the target.

Rotation of the knob 270 also positions the bearing resolver 287 which is shown on Figure 1*a* to indicate a bearing of zero degrees so that voltages which represent the vector components of the bearing will be induced in the east-west coil 288 and north-south coil 289. These voltages pass through calibrating resistors 290 and 291 to the north-south range potentiometer 292 and east-west range potentiometer 293, respectively.

The range knob 294 (see Figures 2 and 1*a*) is then adjusted for the distance in miles which results in shifting the position of the slider of the potentiometers and in effect determining the initial voltage which will drive the positioning motors 86—86' (see Figure 1*c*).

On Figures 1*a* and 1*b* there may be seen the zero set potentiometers 285, 285', 286 and 286' which are connected by the switches 278*a* and 279*a*, respectively. The selection of either of the potentiometers by the quadrant selector circuits will determine the direction in which the positioning motors will travel to position the crab element for the starting point during the "approach" stage.

Upon pressing the function switch 306 to "auto approach" contact 299, the approach relay 307 is energized and current flows through the east-west approach gain control 297 and north-south approach gain control 298 to result in automatically positioning the crab element to the initial starting position. The last-mentioned gain controls 297 and 298 are merely resistors which serve to prevent excessive voltages from driving the positioning motors so rapidly that the crab will overshoot its mark and hunt excessively.

Rotation of the individual positioning motors 86 and 86' is governed by the summation of voltages of the range potentiometers 292 and 293 as matched against the voltages of the positioning potentiometers 317 and 318, for the particular channel involved, the direction of rotation being governed by the selection of the particular zero set potentiometer.

As mentioned at a point earlier in the disclosure, the approach stage is performed at a scale of eight miles per inch or one mile per inch, but not at sixteen miles per inch, the normal searching scale employed. In the event that the pilot has neglected to adjust the scale factor switch 301 (see Figures 2 and 1*c*), a solenoid interlock 302 (see Figure 1*a*) prevents illumination of a quadrant light.

Once commenced, the north-south holding relay 303 and east-west holding relay 304 continues the positioning operation, so that contact of the switch 306 at the auto approach position 299 need be only momentary to operate the approach relay 307. The switch is preferably of a type including a spring return upon release of the button. If desired, the holding relays 303 and 304 may be eliminated to be substituted by a time switch operated by a driven motor (not shown). In such a case, the switch must include a time factor just sufficient to enable the crab element to slew diagonally across the plotting area since excessive time would permit the servo loop lag to exceed 180 degrees. When the servo loop lag exceeds 180 degrees, subsequent return to a null position will not reflect the present position of the airplane.

During the automatic positioning functions, which include both "auto approach" and "auto attack," the stylus element is deenergized so that no trace occurs as the crab element moves to its starting position. This permits the return spring 172 to move the same downwardly away from the pressure-sensitive material upon which the plot is being made. When the switch 306 is moved to perform the approach function, the output relay 222 is energized, resulting in interruption of the 28 volt current from the contact 229 which supplies the current to the mark stylus solenoid 261.

Current supply to the motors 56 and 56' is also interrupted by the operation of the relay 222 which opens the contacts 331, 332, 333 and 334 leading to the variable phase windings 337 and 338 and connects windings 339 and 440. The output relay remains energized during the positioning operation. As may be seen on Figure 1*c*, this current also passes through the interlock provided by the paper transport relay 221 so that the trace stylus is deactivated during the operation of the paper transport motor, or auto approach function.

At the completion of the "auto approach" function, the crab element will be positioned the proper scale distance on the plotting area from the target represented by a point near the illuminated quadrant light, and the device returns to its normal follow and trace functions. The pilot may now fly to the target, the trace indicating the path of flight.

Upon arrival at the target, the "attack" function is performed by moving the switch 306 to the attack contact 309. The function performed is similar to that of the approach function, but in this case, the crab element is centered within the plotting area. Energizing the attack relay 310 causes the contact, indicated by reference character 311, to connect the north-south centering gain control 312, and a contact, indicated by reference character 313, to connect the east-west centering gain control to the movable arms on the positioning potentiometers 317 and 318. Interlock contacts 320 and 320' prevent immediate successive operation of contacts 309 and 299 from damaging the system, since the connections prevent the commencement of one function until a previously commenced function has been completed. This is accomplished through the agency of relays 303 and 304 which lock up relays 310 or 307 until their respective functions have been completed.

As the device is operated by follow motors 56 and 56' which drive positioning potentiometers 317 and 318, it may, on occasion, occur that the pilot intent upon his mission may fly in such manner that the crab 40 reaches the edges of the plotting area, and continued flight in the same direction will result in damaging the crab, as well as other parts of the device. This is prevented by means of a north-south limit switch 319, and a corresponding east-west limit switch 319', either or both of which may be individually activated by the reaching of the limits of travel of the positioning potentiometers, which correspond to the limits of travel of the crab.

Reference is made to Figure 3 at this point wherein it may be observed that the limit switches 319 and 319' are in effect each comprised of separate units which regulate and arrest movement at either end of the path of travel.

Referring to the north limit switch, the same includes a first gang 321, which when moved, illuminates the limit light 322, which warns the pilot that a limit has been reached. The light 322 is powered through a capacitor 323 which prevents any direct current which may be in the line from reaching the filament. The first gang 321 also interrupts the current to the N section of the slewing switch 250 to prevent manual driving of the crab in the north direction.

The second gang 324 shifts in position to interrupt the north follow current. It simultaneously connects winding 235 to provide a small voltage of proper phase to drive the crab element away from the limit so that no damage occurs. When this reverse motion occurs the limit switch is restored to its initial position and the crab element again is driven toward the edge. This oscillating action occurs with full torque of the motor and the motor is always ready to resume normal action without delay. When the pilot directs the airplane to return to the plotting area the proper position of the plane is shown provided the oscillating action was not prolonged for a period exceeding 180 degrees rotation of the input synchro 56.

Gangs 325 and 326 provide a similar function when an opposite south limit is reached, and corresponding east-west functions are performed by contacts 327, 328, 329 and 330' on the switch 319. As the limit switches are activated by small pins 335 on the pulleys 128 and 130 which contact resilient blades 336, the limit switches are operative when the same occurs during manual slewing or normal following by the servo motors 56 and 56'.

Turning now to the second embodiment of the invention, the same is illustrated on Figures 12 to 15, inclusive.

The second embodiment differs from the first embodiment in several major respects, as well as a number of minor refinements. In the second embodiment the crab element is supported upon a sliding bridge structure capable of moving in an east-west direction upon the frame element of the device, and the crab element moves upon the bridge in a north-south direction, this construction replacing the sliding rods of the first embodiment. The crab element rolls directly upon ballbearings using the re-entrant ball principle instead of sliding upon the rods. A heading oriented arrow is provided upon the crab element which serves to indicate the direction in which the airplane is pointed as contrasted with the direction in which the same is moving. The marking stylus of the first embodiment is replaced by a second pointed stylus disposed radially of the axis of rotation of the heading arrow, means being provided for the movement of the second stylus orbitally with respect to the primary stylus to form a circular mark when an electrical impulse is received, the illumination of the crab element is such as to provide directional indication in conjunction with the heading arrow.

With regard to the electrical circuits separate follow and slew amplifiers are provided as contrasted with the time-shared single amplifiers. To shorten the time required for automatic slewing operations, electric null detectors are provided to permit subsequent functions upon the completion of each automatic slew operation. Automatic crab element centering and approach functions are retained and an additional function referred to hereinafter as "off course plotting" permits the marking of locations disposed a substantial distance from the course being flown.

As the second embodiment is particularly adapted for installation in larger aircraft having substantial crews, provision is also made for the operation and/or partial control of the device by the pilot, the radio operator or the computer operator. Means is provided permitting the shifting of control at one station, and necessary interlocks prevent control from more than one station at a particular instant.

Referring to Figure 12 of the drawing, the chassis or frame element 410 is provided with an upper horizontally disposed flange member 411 and a lower horizontally disposed flange member 412 which support a bridge element 413 for sliding movement leftwardly or rightwardly corresponding to east-west movement. The bridge element 413 includes a pair of flange engaging blocks 414 and 415 provided with circulating ball bearings disposed within raceways 416. The bridge rails 417 and 418 are vertically disposed, each being provided with a channeled portion 419 as well as reinforcing flanges 420. As best seen on Figure 14 of the drawing, the milled channel 421 in each rail is of generally V-shaped cross section.

Figure 14:
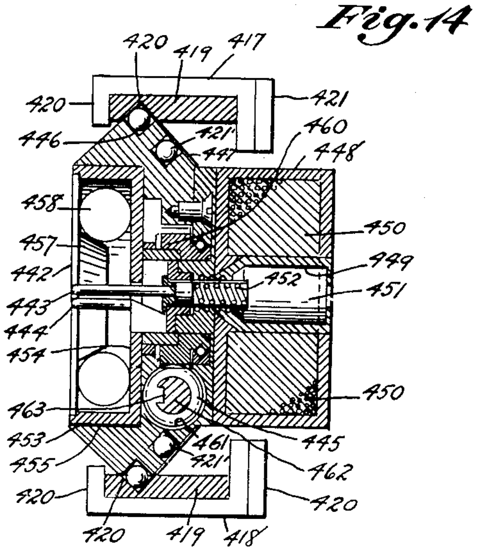
Figure 14 is a central sectional view as seen from the plane 14—14 on Figure 13.

The crab element 422 is supported within the channel 421 by ballbearings 421' seen on Figure 14, and is displaced by cable means. A first cable 423 is anchored at point 424 on a first or upper drum 425. The cable is served counterclockwise around the drum, and continues around an upper hand pulley 426, then around pulley 427 on the block 414 to the crab block 422. A second cable 428 is anchored at point 429 on the upper drum 425, and is guided around the spring loaded pulley 430, the righ-hand lower pulley 431 the pulley 432 on the block 415 and is anchored on the crab block 422. Directly below the upper drum 425, and differentially operative through a planetary spur differential (not shown) is a lower drum 433. A third cable 434 is attached to the lower drum 433 in a manner similar to the cable 423 on the upper drum 425. This cable is served clockwise around the lower drum, then around the lower pulley 435, anchored to the upper bridge block 414, around pulley 436, spring loaded pulley 437, then around pulley 438 to be anchored on the bridge block 415, then around pulley 439 and back to the lower drum 433.

From a consideration of the above, it will be apparent that motion of the upper drum 425 while the lower drum 433 is stationary will cause the crab block 422 to move in a vertical north-south direction, while simultaneous motion of the upper and lower drums in opposite directions and of equal amount will cause the bridge element 413 to move horizontally east-west without disturbing the vertical displacement of the crab block along the bridge element.

Figure 13:
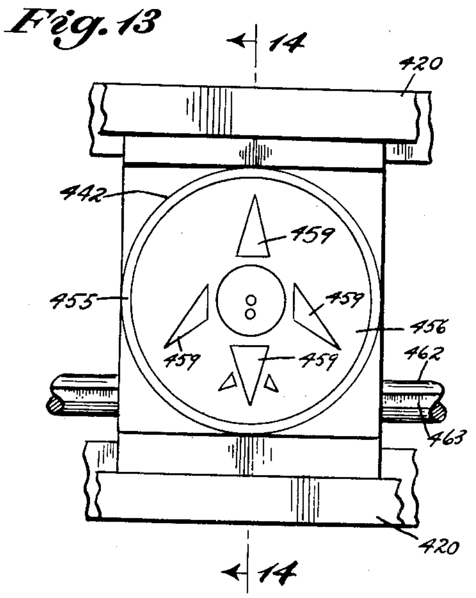
Figure 13 is a fragmentary enlarged plan view showing the crab element comprising a part of the second embodiment.

Referring to Figures 13 and 14 on the drawing, the crab element 440 includes the above mentioned crab block 422, a rotatable heading indicating member 442, a first axially disposed stylus 443, a second radially displaced stylus 444 and rotational motion transmitting means 445.

The crab block 422 is provided with circulating raceways 446 and retaining plates 447 for maintaining the balls 421' within the raceways. A circular recess 448 retains a solenoid 449 including a coil member 450 and an armature member 451. The armature member 451 elevates both styli 443 and 444 simultaneously, while a spring 452 serves to keep the styli gently pressed against the tracing film. In use the styli are withdrawn from contact with the paper by the action of gravity, and the repelling action of the spring 452.

The rotatable member 442 is confined within a circular shell 453 having an inner wall 454 and a peripheral sidewall 455. The heading indicating member 456 is positioned within a rabbet in the sidewall 455, the members 453—456 defining a cavity 457 in which illuminating means 458 is disposed. As seen on Figure 13, the heading indicating member is provided with translucent portions 459 forming a heading arrow.

The motion transmission means 445 includes a helically cut gear 460 driven by a worm gear 461 on shaft 462. The shaft is provided with a keyway 463 permitting the worm gear 461 which is axially fixed within the crab block to travel along the shaft as the crab block moves along the bridge element 413. The shaft 462 is driven through a similar splined arrangement (not shown) disposed within the bridge block 414 by a shaft 464 anchored at flange 465 on the chassis 410 and within the support 466 at the opposite end thereof. Gears 467 and 468 transmit motion from the heading follow motor (described hereinbelow), which motor also provides for the rotation of the second stylus 444 through a continuous full revolution about the stylus 443 during a marking function.

Referring to Figure 15*a*, a schematic representation of the pilot control panel is generally designated by reference character 475. The functions over which the pilot has control include manual slewing, marking, and the option of placing the function switch in standby, slew or trace positions. Four slew switches 476, 477, 478 and 479 provide for slewing in the directions north, south, east and west respectively. A fast slew relay 480 acts to short out fixed resistances 481, thus permitting the slew motors to operate at a faster rate where large traverses are required. The slew interlock 482 prevents slewing under the control of the pilot while other functions are instituted from other locations. The mark switch 483 institutes the marking function described above, while the target light 484 advises the pilot of the insertion of target information by the radio operator or computer. The target reply circuit (Figure 15*b*) is operated by pressing the target light 484 to close the switch disposed therebeneath shorting a relay in series with a protective resistor to cause the relay to open and extinguish a corresponding light on another control panel.

The control panel of the remote operator, generally indicated by reference character 486 provides for control of the functions over which the pilot has control, and in addition provides for the setting in of target information, adjusting the scale range where necessary, and master control of the panel, that is to say, a determination over which panel has control. The unit 486 includes a bearing resolver 487 having an east-west component 488 and a north-south component 489 and is operated by the manual control 490 similar to the corresponding structure in the first embodiment. The azimuth synchro 491, which supplies information to a radar indicator cursor bearing servo, is mechanically coupled with the bearing knob 490 during the setting in of target information as additional means of indicating the target to the radar operator. The range knob 492 includes an automatic scale factor selector 493 operated by a cam 494 which permits the setting in of target ranges under scale factors of one mile to the inch or four miles to the inch, the scale selected depending upon the magnitude of the range. Scale relays 495, 496 and 497 are also mechanically brought into operation by means of illuminated switches 498, 499 and 500, respectively. The scale factor is inserted by electric gear boxes, rather than the manual system employed in the first embodiment. The insert relay 501 operated by illuminated switch 502 serves to ground signal information during the time target information is being set into the device as is the case in the first embodiment. The switch 502 also activates the stepper switch 529 as will more fully appear.

The east-west range potentiometer 503 and north-south range potentiometer 503 are manually controlled by the range knob 492 which also adjusts a range strobe potentiometer 504. The range potentiometers provide the necessary voltage for automatic slewing as in the first embodiment, while the range strobe potentiometer is coupled to a cursor in the radar display to provide a bright marking point on the sweep of the cursor. The specific details of the radar display are not illustrated on the drawings, and form no part of the present disclosure. The pilot remote operator control switch 505 provides the master control referred to above, and controls the slew interlock through an interlock relay 505 (Figure 15*b*). The mark switch 506 provides the same function as the switch 483, this marking function being "on course" marking of the type performed by the first embodiment of the invention.

The function switch 511 includes a first position 512 providing for automatic centering of the crab element within the plotting area, a second position 513 corresponding to the approach function in which the target is assumed to be at the center of the plotting area and in which range and bearing information is employed to slew the crab element to a position corresponding to the present position of the aircraft in relation to the target, a third position 514 corresponding to "off course" plotting, and a fourth 515 for use where information is set into the device from a computer as compared with the manually setting in of the information of the second position. The power switch 516 includes an off position, a standby position in which the servos store information, and a run position in which the crab element follows the information fed by the servos and "PLT" position to perform the function formerly described for switch 505.

Referring to Figure 15*b*, the function relays of the first embodiment have been replaced by a multigang follow switch having stepping relays operated by the position of the function switch, and a second similar switch having automatic stepping and homing means. Each of the gangs or decks is provided with four positions corresponding to the four function positions, the stepping switch operating one step each time a null in voltage is reached during the sequence of the automatic function. As indicated on Figure 15*b*, the gangs or decks include east-west slew 516A and 516B, north-south slew 516C and 516D, east-west follow 516E, north-south follow 516F, latch operation 516G, clutch operation 516H, trace solenoid 516J and homing control 516K.

As mentioned above, there is no time sharing of the amplifiers, which include a heading amplifier 518, a north-south follow amplifier 519, an east-west follow amplifier 520, a north-south slew amplifier 521 and an east-west slew amplifier 522. The power relay 523 is operated by the power switch 516. An east-west null detector 524 and a north-south null detector 525 replace the timing motor or relays used in the first embodiment in connection with automatic functions. The mark relay 527 is operated by either mark switch 483 or mark switch 506 when energized for "on course" plotting and is automatically energized during "off course" plotting. The power transformer 526 is of a multi-type, substantially identical with that of the first embodiment. The upper gang switch 528, as has been mentioned, directly follows the position of the function switch 511, while the stepping switch 529 is provided with a stepping relay 530 controlled by null detectors 524 and 525. The clutch control relay 531 is normally energized, except for manual and automatic slewing.

The north, south, east and west limit relays 532, 533, 534 and 535 are operated by north, south, east and west limit switches, 536, 537, 538 and 539, respectively (see Figure 15*c*). The operation is substantially identical with that of the first embodiment.

With regard to the mechanical components of the second embodiment (see Figs. 16 and 17), the north-south follow motor 546 drives a gear train 548 through the scale selector clutch 547′, differential 544, a second clutch 542 to the north-south present position potentiometer 567. The north-south slew motor 540 drives through a gear train 541 to the north-south slew clutch 542 during manual and automatic slewing function. The clutch 542 has no counter part in the first embodiment, since the latch 543 provides the same function as the clutch 66 (see Figure 4) of the first embodiment. The clutch 542 serves to interconnect the slew motor 540 with the crab element.

The east-west follow motor 556, gear train 558, scale clutch 556′, latch 553, differential 554, clutch 552, east-west present position potentiometer 568, east-west slew motor 550 and gear train 557 correspond to those of the north-south equivalents.

The heading motor 559 drives the azimuth synchro 491 (Figure 15*a*) and drives through a gear train 560 to the motion transmission means 445 described hereinabove. The single revolution switch 561 (also seen on Figure 17) is operated by a relay 562 during the marking function. A switch 563 serves to ground follow information during the marking cycle while a second switch 564 closes the latches 553 and 543 to stop movement of the crab element during the marking function, the same being controlled by a relay associated therewith. A trace solenoid switch 565 operated by a relay operates the trace solenoid 449.

The north-south reference potentiometer 567 and east-west reference potentiometer 568 are driven by movement of the crab element, and indicate the position of the crab element as contrasted with the position of the base reference.

Referring to Figure 17, there is shown a schematic view of the single revolution switch 561. The switch includes a supporting bracket 601, mounted upon a portion 602 of the chassis. Insulation means 603 insulates the bracket 601 from the portion 602. The bracket 601 supports a rotatable metallic disc 604 through a shaft 605. The upper surface of the disc 604 is provided with a cork layer 606 while the lower surface 607 includes an insulated circular insert 608. A lower disc 609 is preferably formed from conductive material and is supported on a shaft 610 which transmits motion through gears 611, 612 and 613 to the means for rotating the heading indicating mechanism disposed within the crab lock. A solenoid 562 controls a lever 615 having a jaw or clutch adapted to press upon the cork layer 606 when the solenoid is energized. During a marking function, current is momentarily fed to the solenoid 562 which causes the jaw 616 to remain stationary upon the surface 606. The momentary current is fed to the motor 559 which commences rotation driving the lower disk 609 to a point where a metallic ball 617 makes contact through the metallic disk 604 until a complete rotation has been made whereupon the ball 617 comes to rest upon the insulated portion 608. Thus, when the mark button is pressed, the contact need be only momentary, sufficient to energize the solenoid 562. The contact of the ball 617 with the lower surface 607 of the disk 604 maintains the flow of current to the heading motor sufficient to complete a complete revolution of the heading indicating means which results in the trail stylus executing a complete revolution as described hereinabove.

The operation of the second embodiment generally resembles that of the first embodiment. In the first position of the function switch, pressing the insert button 502 refers the wipers of the reference potentiometers 567 and 568 to ground potential to result in operation of the slew motors to bring the crab element to the center of the plotting area. In the second position, the quadrant lights of the first embodiment are eliminated, and the target is assumed to be in the center of the plotting area, range and bearing information being used to provide voltages in the range potentiometers to result in slewing the crab element to a starting position whereby the same may be located at the selected range and bearing from the center of the plot from where it may travel to the center of the plotting area as the target is approached.

The third position of the function switch is employed for the "off-course" plotting function in which a mark is placed upon the plotting area corresponding to the indicated position of the target by the crab element which temporarily interrupts its "on-course" plotting to place the mark at a point displaced from the present position of the crab element, following which, the crab element returns to its position to continue indicating the course flown by the aircraft. During this time, servo information is continuously stored so that the crab element may return to the present position of the aircraft without more than a minor interruption of the continuous plotting of the course. This function is accomplished by placing the function switch in the third position, and setting in range and bearing information in the normal manner following which the insert button is pressed. During the period where the stepping switch 529 is in the second step, the voltages of the range potentiometers are compared with those of the off-course target potentiometers resulting in the slewing of the crab element to the indicated position of the target. When a voltage null is reached, the stepping switch advances to the next position which feeds a constant voltage to the heading follower motor to result in rotating the radially disposal stylus through substantially 360 degrees about the primary stylus resulting in the placing of a circular mark upon the plotting paper. At the completion of this stage, the stepping switch, operated by the marking circuit relay, advances to a third position in which the off-course target potentiometers are compared with ground potential resulting in a return of the crab element to resume "on course" plotting when the stepping relay advances to the "first" position again. During the "off course" plotting function, the present position synchros are not driven by the follow motors, however, when tracking resumes, the synchros are caught-up to the new present position, a function which is possible by virtue of the provision of separate slew and follow amplifiers.

In the fourth position of the function switch, the device is connected to an automatic computer, the details of which form no part of the present disclosure, which automatically sets in position coordinate information, as contrasted with the manual range and bearing insertion of position three of the function switch. All of the automatic functions of position three are available at position four in the manner described above, with the exception of the range potentiometers (described in column 15, line 23). The external position coordinate potentiometers' voltages are referred or compared to the present position (or reference) potentiometers in step 2.

We wish it to be understood that we do not consider the invention limited to the exact details of structure shown and set forth in this specification, for obvious modifications will occur to those skilled in the art to which the invention pertains.

We claim:

1. Crab element structure for use in conjunction with a plotting device comprising: first and second supporting rails arranged at mutual right angles, each of said rails having a principal axis; means for moving each of said supporting rails laterally with respect to the axes thereof; a crab slidably engaged with each of said rails, whereby movement of said crab may indicate the vector addition of movement of said first and second supporting rails; illumination means disposed upon said crab, one of said supporting rails being electrically insulated with respect to said crab and connected to said illumination means, the other of said supporting rails being grounded with respect to said crab, whereby current may be supplied to said illumination means through said supporting rails; tracing means including a magnetically energized stylus disposed adjacent said illumination means; said supporting rails having means associated therewith for selectively supplying to said crab alternating current and a direct current, whereby upon supplying alternating current the illumination means may become operative, and upon supplying direct current, both said illuminating means and said tracing means may become operative.

2. Crab element structure for use in conjunction with a plotting device comprising: first and second supporting rails arranged at mutual right angles, each of said rails having a principal axis; means for moving each of said supporting rails laterally with respect to the axes thereof; and a crab slidably engaged with each of said rails, whereby movement of said crab may indicate the vector addition of movement of said first and second supporting rails; illumination means disposed upon said crab, one of said supporting rails being electrically insulated with respect to said crab and connected to said illumination means, the other of said supporting rails being grounded with respect to said crab, whereby current may be supplied to illumination means through said supporting rails; tracing means including a magnetically energized stylus disposed adjacent said illumination means, and point marking means including a second magnetically energized stylus, said point marking stylus being disposed concentrically with respect to said tracing stylus; said illumination means, trace stylus and mark stylus each being electrically connected in parallel with respect to said first and second supporting rails said illumination means having in series therewith a rectifying means allowing current to pass only in a first direction; said trace stylus having magnetic actuating means; said mark stylus having magnetic actuating means and having in series therewith a rectifying means of polarity opposite that of said first rectifying means; and means for selectively applying alternating current and direct current of first and second polarities to said supporting rails.

3. Structure according to claim 2, in which said first and second rectifying means are in the form of germanium diodes.

4. A device for plotting the path of motion of an aircraft with respect to the ground comprising: first means including first and second synchros for receiving coordinated electrical servo information, second means including first and second electrical follow motors associated with said first and second synchros, respectively, and third means including a crab element arranged for planar motion and driven by said follow motors; said crab element including indicator means thereon; paper support means disposed adjacent said crab element upon which said indicator means may describe said path of motion, and means for automatically positioning said crab element to a pre-selected initial plotting position; said automatic positioning means including first and second positioning motors, first and second positioning potentiometers controlling, respectively, said first and second positioning motors, and means for interconnecting predetermined points upon said potentiometers to provide voltages for driving said positioning motors, said motors being associated with said potentiometers in such manner that movement of said positioning motor serves to reduce the voltage in said potentiometers which is transmitted to said motors.

5. A device for plotting the path of motion of an aircraft with respect to the ground comprising: first means including first and second synchros for receiving coordinated electrical servo information, second means including first and second electrical follow motors associated with said first and second synchros, respectively, and third means including a crab element arranged for planar motion and driven by said follow motors; said crab element including indicator means thereon; paper support means disposed adjacent said crab element upon which said indicator means may describe said path of motion, and means for automatically positioning said crab element to a pre-selected initial plotting position; said automatic positioning means including first and second positioning motors, first and second positioning potentiometers controlling respectively said first and second positioning motors, means for interconnecting predetermined points upon said potentiometers to provide voltages for driving said positioning motors, said motors being associated with said potentiometers in such manner that movement of said positioning motor serves to reduce the voltage in said potentiometers which is transmitted to said motors; quadrant selector means and range selector means, and means for intermittently interconnecting said quadrant selector and range selector means with said positioning motors.

6. A device for plotting the path of motion of an aircraft with respect to the ground comprising: first means including first and second synchros for receiving coordinated electrical servo information, second means including first and second electrical follow motors associated with said first and second synchros, respectively, and third means including a crab element arranged for planar motion and driven by said follow motors; said crab element including indicator means thereon; paper support means disposed adjacent said crab element upon which said indicator means may describe said path of motion, and means for automatically positioning said crab element to a pre-selected initial plotting position; said last mentioned means including an adjustable range and bearing selector; said range selector determining a voltage for moving said crab element a given distance with respect to said plotting area, and said bearing selector determining the direction of crab element movement; and drive means controlled by said range and bearing selector for moving said crab element in response thereto.

7. A device for plotting the path of motion of an aircraft with respect to the ground comprising: first means including first and second synchros for receiving coordinated electrical servo information, second means including first and second electrical follow motors associated with said first and second synchros, respectively, and third means including a crab element arranged for planar motion and driven by said follow motors; said crab element including indicator means thereon; paper support means disposed adjacent said crab element upon which said indicator means may describe said path of motion, and means for automatically positioning said crab element to a pre-selected initial plotting position; said last mentioned means including an adjustable range and bearing selector, said range selector determining a voltage for moving said crab a given distance with respect to said paper support means; said bearing selector including a bearing resolver for forming coordinate voltages whereby the direction of movement of said crab element may be determined; drive means controlled by said range and bearing selector for moving said crab element in response thereto; and quadrant indicator means for indicating the direction of movement of said crab element within a given coordinate quadrant.

8. A device for plotting the path of motion of an aircraft with respect to the ground comprising: first means including first and second synchros for receiving coordinated electrical servo information, second means including first and second electrical follow motors associated with said first and second synchros, respectively, third means including a crab element arranged for planar motion and driven by said follow motors; said crab element including indicator means thereon; paper support means disposed adjacent said crab element upon which said indicator means may describe said path of motion, and means for automatically positioning said crab element to a pre-selected initial plotting position within a plotting area; said last mentioned means including first means comprising an adjustable range and bearing selector, said range selector determining a voltage for moving said crab element a given distance and said bearing selector determining a direction of movement of said crab element; drive means controlled by said range and bearing selector for moving said crab element in response thereto; and means controlling said crab drive means for automatically centering said crab element within said plotting area.

9. A device for plotting the path of motion of an aircraft with respect to the ground comprising: first means including first and second synchros for receiving coordinated electrical servo information, second means including first and second electrical follow motors associated with said first and second synchros, respectively, and third means including a crab element arranged for planar motion and driven by said follow motors; said crab element including indicator means thereon; paper support means disposed adjacent said crab element upon which said indicator means may describe said path of motion, means for automatically positioning said crab element to a pre-selected initial plotting position; said last mentioned means including an adjustable range and bearing selector, said range selector determining a voltage for moving said crab a given distance with respect to said paper support means; said bearing selector including a bearing resolver for forming coordinate voltages whereby the direction of movement of said crab element may be determined; drive means controlled by said range and bearing selector for moving said crab element in response thereto; and means for preventing the functioning of either of said last mentioned drive means or follow motors, until the completion of the functioning of the other.

10. A device for plotting the path of motion of an aircraft with respect to the ground comprising: first means including first, second and third synchros adapted to receive computed electrical servo information, second means including first, second and third electrical follow motors associated with said first, second and third synchros respectively; third means including a crab element arranged for planar motion and driven by said first and second follow motors; said crab element including a heading indicator means thereon, said heading indicator means being rotationally driven by said third follow motor; said crab element having tracing means associated with said heading indicator means including a first pointed stylus positioned axially with respect to the axis of rotation of said heading indicator means, and a second pointed stylus positioned radially with respect to said axis of rotation, whereby upon actuation of said third follow motor, said second stylus may describe an arcuate path of motion about said first stylus.

11. In a device for plotting the path of motion of an aircraft with respect to the ground comprising: first means including first, second and third synchros adapted to receive coordinated electrical servo information, second means including first, second and third electrical follow motors associated with said first, second and third synchros, respectively; third means including a crab element arranged for planar motion and driven by said first and second follow motors; said crab element including a heading indicator means thereon, said heading indicator means being rotationally driven by said third follow motor; the improvement comprising: said crab element having tracing means associated with said heading indicator means including a first stylus positioned axially with respect to the axis of rotation of said heading indicator means, and a second stylus positioned radially with respect to said axis of rotation; and means for driving said heading indicator means through a predetermined angular displacement to cause said second stylus to describe an arcuate path of motion.

12. In a device for plotting the path of motion of an aircraft with respect to the ground comprising: first means including first, second and third synchros adapted to receive coordinated electrical servo information, second means including first, second and third electrical follow motors associated with said first, second and third synchros, respectively; third means including a crab element arranged for planar motion and driven by said first and second follow motors; said crab element including a heading indicator means thereon, said heading indicator means being rotationally driven by said third servo motor; the improvements comprising: said crab element having tracing means associated with said heading indicator means including a first stylus positioned axially with respect to the axis of rotation of said heading indicator means, and a second stylus positioned radially with respect to said axis of rotation; and means for driving said heading indicator means through a predetermined angular displacement to cause said second stylus to describe an arcuate path of motion; said last mentioned means including a single revolution switch to rotate with said heading means.

13. In a device for plotting the path of motion of an aircraft with respect to the ground, a chassis, a pair of parallel rails disposed upon said chassis, a bridge supported for movement parallel to the axis of said rails, a crab element slidably disposed upon said bridge for perpendicular movement with respect to the axis of said rails, a heading indicating means disposed upon said crab element, motor means disposed upon said chassis, a first shaft mounted for rotation on said chassis, said shaft having a principal axis disposed parallel to the axis of said rails and driven by said motor means, a second shaft mounted for rotation upon said bridge and driven through a splined interconnection by said first shaft, gear means mounted for rotation on said crab element and driven through a splined interconnection with said second shaft, said heading indicating means being connected with said last mentioned gear means.

14. In a device for plotting the path of motion of an aircraft with respect to the ground, the improvement comprising: first means including first and second synchros adapted to receive coordinated electrical servo information, second means including first and second electrical follow motors associated with said first and second synchros, respectively and first and second slew motors; third means including a crab element arranged for planar motion and driven by said follow motors, said crab element including marking means thereon; a first pair of reference potentiometers driven by motion of said crab element, a second pair of off-course target potentiometers driven by said first and second slew motors, a third pair of independently controlled range potentiometers; means for selectively in predetermined sequence comparing the voltages of said range potentiometers with the voltages of said reference potentiometers, operating said marking means, and comparing the voltages of said reference potentiometers with the voltage of said off course target potentiometers.

15. In a device for plotting the path of motion of an aircraft with respect to the ground, the improvement comprising: first means including first and second synchros adapted to receive coordinated electrical servo information, second means including first and second electrical following motors associated with said first and second synchros, respectively and first and second slew motors; third means including a crab element arranged for planar motion and driven by said follow motors, said crab element including marking means thereon comprising a stylus arranged for orbital motion with respect to an axis of rotation; a first pair of reference potentiometers driven by motion of said crab element, a second pair of off-course target potentiometers driven by said first and second slew motors, a third pair of independently controlled range potentiometers, means for selectively, in predetermined sequence, comparing the voltages of said range potentiometers with the voltages of said reference potentiometers, orbitally moving said stylus, and comparing the voltages of said reference potentiometers with the voltages of said off-course target potentiometers.

16. A device for plotting the path of motion of an aircraft with respect to the ground comprising: first means including first and second synchros for receiving coordinated electrical servo information, second means including first and second electrical follow motors associated with said first and second synchros, respectively, and third means including a crab element arranged for planar motion and driven by said follow motors; said crab element including indicator means thereon; means disposed adjacent said crab element upon which said indicator means may describe said path of motion, and means for automatically positioning said crab element to a preselected initial plotting position, said automatic positioning means including first and second positioning motors, first and second positioning potentiometers controlling, respectively, said first and second positionig motors; a first differential, said first follow motor and first positioning motor being connected to said first differential for selectively transmitting motion along a first axis to said crab element, a second differential, said second follow motor and second positioning motor being connected to said second differential for selectively transmitting motion along a second axis to said crab element, said first and second axes being mutually perpendicular.

17. A device for plotting the path of motion of an aircraft with respect to the ground comprising: first means including first and second synchros for receiving coordinated electrical servo information, second means including first and second electrical follow motors associated with said first and second synchros, respectively, and third means including a crab element arranged for planar motion and driven by said follow motors; said crab element including indicator means thereon, means disposed adjacent said crab element upon which said indicator means may describe said path of motion, and means for automatically positioning said crab element to a pre-selected initial plotting position, said automatic positioning means including first and second positioning motors, first and second positioning potentiometers controlling, respectively, said first and second positioning motors; a first differential, said first follow motor and first positioning motor being connected to said first differential for selectively transmitting motion along a first axis to said crab element, a second differential, said second follow motor and second positioning motor being connected to said second differential for selectively transmitting motion along a second axis to said crab element, said first and second axes being mutually perpendicular; and latch means associated with each of said first and second differential for locking said follow motors during operation of said positioning motors.

18. In a plotting device, an improved crab element comprising: a frame member, first and second pointed marking styli supported by said frame member, said second stylus being arranged upon said crab element for rotational motion in a plane about said first stylus, electrically powered means for driving said second stylus in said rotational motion, and a single revolution switch having a contact connected to said second stylus and moving therewith for controlling said electrically powered driving means, whereby a single revolution of said switch interrupts the operation of said driving means.

19. Structure according to claim 18 including solenoid means for simultaneously moving both said first and second styli in a direction perpendicular to said plane of rotational motion against a surface to be marked.

References Cited in the file of this patent

UNITED STATES PATENTS

| | | |
|---|---|---|
| 1,123,795 | Pollen et al. | Jan. 5, 1915 |
| 1,261,965 | Sokolov | Apr. 9, 1918 |

(Other references on following page)

UNITED STATES PATENTS

| | | |
|---|---|---|
| 1,293,747 | Ford | Feb. 11, 1919 |
| 2,171,327 | Anderson | Aug. 29, 1939 |
| 2,395,351 | Sohn | Feb. 19, 1946 |
| 2,424,118 | Rast | July 15, 1947 |
| 2,566,546 | Barnes et al. | Sept. 4, 1951 |
| 2,606,092 | Rich | Aug. 5, 1952 |
| 2,661,260 | Salzman | Dec. 1, 1953 |
| 2,669,500 | Och et al. | Feb. 16, 1954 |
| 2,699,606 | Breau | Jan. 18, 1955 |
| 2,727,308 | Kuhn et al. | Dec. 20, 1955 |

FOREIGN PATENTS

| | | |
|---|---|---|
| 27,084 | Great Britain | of 1909 |